US009157155B2

(12) United States Patent
Taniguchi et al.

(10) Patent No.: US 9,157,155 B2
(45) Date of Patent: Oct. 13, 2015

(54) PHOTOELECTROCHEMICAL CELL AND ENERGY SYSTEM USING SAME

(75) Inventors: Noboru Taniguchi, Osaka (JP); Kenichi Tokuhiro, Osaka (JP); Takahiro Suzuki, Osaka (JP); Tomohiro Kuroha, Aichi (JP); Takaiki Nomura, Osaka (JP); Kazuhito Hato, Osaka (JP); Satoru Tamura, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 899 days.

(21) Appl. No.: 13/393,107

(22) PCT Filed: Mar. 22, 2011

(86) PCT No.: PCT/JP2011/001661
§ 371 (c)(1),
(2), (4) Date: Feb. 28, 2012

(87) PCT Pub. No.: WO2011/121932
PCT Pub. Date: Oct. 6, 2011

(65) Prior Publication Data
US 2012/0156578 A1 Jun. 21, 2012

(30) Foreign Application Priority Data
Mar. 31, 2010 (JP) .................. 2010-083418

(51) Int. Cl.
C25B 1/06 (2006.01)
B01J 35/02 (2006.01)
(Continued)

(52) U.S. Cl.
CPC ............. *C25B 1/003* (2013.01); *C25B 11/0442* (2013.01); *B01J 35/004* (2013.01); *H01M 8/0656* (2013.01); *Y02E 60/366* (2013.01); *Y02E 60/368* (2013.01)

(58) Field of Classification Search
None
See application file for complete search history.

(56) References Cited

U.S. PATENT DOCUMENTS 4,100,051 A * 7/1978 Kilby et al. ................... 204/266
4,181,593 A 1/1980 McKinzie et al.
(Continued)

FOREIGN PATENT DOCUMENTS

CN 101281932 10/2008
JP 51-123779 10/1976
(Continued)

OTHER PUBLICATIONS

Yuan et al, Synthesis and photocatalytic characterization of a new photocatalyst BaZrO3, International Journal of Hydrogen Energy, vol. 33, No. 21, Nov. 2008, pp. 5941-5946.*
(Continued)

*Primary Examiner* — Harry D Wilkins, III
(74) *Attorney, Agent, or Firm* — Hamre, Schumann, Mueller & Larson, P.C.

(57) ABSTRACT

A photoelectrochemical cell (100) includes: a semiconductor electrode (120) including a conductor (121) and semiconductor layers (122, 123) disposed on the conductor (121); a counter electrode (130) connected electrically to the conductor (121); an electrolyte (140) in contact with surfaces of the semiconductor layer (123) and the counter electrode (130); and a container (110) accommodating the semiconductor electrode (120), the counter electrode (130) and the electrolyte (140). A band edge level $E_{CS}$ of a conduction band, a band edge level $E_{VS}$ of a valence band, and a Fermi level $E_{FS}$ in a surface near-field region of the semiconductor layer, and a band edge level $E_{CJ}$ of a conduction band, a band edge level $E_{VJ}$ of a valence band, and a Fermi level $E_{FJ}$ in a junction plane near-field region of the semiconductor layer with the conductor satisfy, relative to a vacuum level, $E_{CS}-E_{FS}>E_{CJ}-E_{FJ}$, $E_{FS}-E_{VS}<E_{FJ}-E_{VJ}$, $E_{CJ}>-4.44$ eV, and $E_{VS}<-5.67$ eV. The Fermi level $E_{FS}$ in the surface near-field region of the semiconductor layer and the Fermi level $E_{FJ}$ in the junction plane near-field region of the semiconductor layer with the conductor satisfy, relative to the vacuum level, $-5.67$ eV$<E_{FS}<-4.44$ eV and $-5.67$ eV$<E_{FJ}<-4.44$ eV, respectively.

7 Claims, 7 Drawing Sheets

(51) Int. Cl.
*C25B 1/00* (2006.01)
*C25B 11/04* (2006.01)
*B01J 35/00* (2006.01)
*H01M 8/06* (2006.01)

(56) References Cited

U.S. PATENT DOCUMENTS

| | | | |
|---|---|---|---|
| 4,439,301 | A | 3/1984 | Reichman et al. |
| 4,466,869 | A | 8/1984 | Ayers |
| 2010/0282601 | A1 | 11/2010 | Nomura et al. |
| 2011/0203661 | A1* | 8/2011 | Taniguchi et al. ............ 136/258 |
| 2012/0028141 | A1 | 2/2012 | Nomura et al. |

FOREIGN PATENT DOCUMENTS

| | | |
|---|---|---|
| JP | 2002-143688 | 5/2002 |
| JP | 2002-234105 | 8/2002 |
| JP | 2003-154272 | 5/2003 |
| JP | 2009-507752 | 2/2009 |
| JP | 2009-519204 | 5/2009 |
| JP | 2009-527879 | 7/2009 |
| WO | WO 2007/095988 | 8/2007 |
| WO | WO 2007/120176 | 10/2007 |
| WO | WO 2008/060293 | 5/2008 |
| WO | WO 2010/050226 | 5/2010 |
| WO | WO 2010/125787 A1 * | 11/2010 ............... B01J 35/02 |
| WO | WO 2011/016244 | 2/2011 |

OTHER PUBLICATIONS

Mavroides, et al., "Photoelectrolysis of water in cells with $SrTiO_3$ anodes", Applied Physics Letters, vol. 28, No. 5, Mar. 1, 1976, pp. 241-243.

Chi, et al., "A CdS-modified $TiO_2$ Nanocrystalline photoanode for efficient hydrogen generation by visible light", Nanotechnology, vol. 19, No. 12, Mar. 26, 2008, pp. 1-5.

Jang, et al., "A composite Photocatalyst of CdS Nanoparticles Deposited on $TiO_2$ Nanosheets", Journal of Nanoscience and Nanotechnology, vol. 6, No. 11, Nov. 1, 2006, pp. 3642-3646.

\* cited by examiner

PHOTOELECTROCHEMICAL CELL AND ENERGY SYSTEM USING SAME

TECHNICAL FIELD

The present invention relates to a photoelectrochemical cell in which water is decomposed by irradiation with light and to an energy system using the photoelectrochemical cell.

BACKGROUND ART

There is a conventionally known technique for decomposing water by irradiating a semiconductor material that acts as a photocatalyst with light to obtain hydrogen and oxygen (see, for example, Patent Literature 1). There is another known technique for rendering the surface of a base material hydrophilic by coating the surface of the base material with the semiconductor material (see, for example, Patent Literature 2).

Patent Literature 1 discloses a method in which an n-type semiconductor electrode and a counter electrode are disposed in an electrolyte and the surface of the n-type semiconductor electrode is irradiated with light, so that hydrogen and oxygen are obtained from the surfaces of both electrodes. Specifically, Patent Literature 1 describes that a $TiO_2$ electrode, a ZnO electrode, a CdS electrode, and the like can be used as the n-type semiconductor electrode.

Patent Literature 2 discloses a hydrophilic member. This hydrophilic member is formed of a base material and a coating layer formed on the surface of the base material. The coating layer has a titanium oxide layer that contains titanium oxide particles, and an island-shaped portion that is disposed on the titanium oxide layer and that is made of a second photocatalytic material other than titanium oxide. Specifically, Patent Literature 2 describes the use, as the second photocatalytic material, of a material having potentials at the bottom of the conduction band and the top of the valence band on a more positive side relative to the standard hydrogen electrode potential (i.e., a more negative side relative to the vacuum level) than titanium oxide.

There is also proposed a photocatalytic thin film that exhibits highly efficient photocatalytic performance under natural light (see Patent Literature 3). This photocatalytic thin film is a film obtained by injecting ions of at least one of metals such as Nb, V and Cr into a photocatalytic thin film formed on a base. This film is a gradient film in which the band gap or the potential gradient changes in the thickness direction.

Furthermore, there is also proposed a technique for producing hydrogen by irradiating a multilayer thin film photocatalyst with light (see Patent Literature 4). This multilayer thin film photocatalyst is formed by disposing a first compound semiconductor layer and a second compound semiconductor layer having a band gap different from that of the first compound semiconductor layer sequentially on an electrically conductive base material. Hydrogen is produced by immersing this multilayer thin film photocatalyst in a solution containing hydrogen sulfide and then irradiating this multilayer thin film photocatalyst with light.

CITATION LIST

Patent Literature

Patent Literature 1 JP 51 (1976)-123779 A
Patent Literature 2 JP 2002-234105 A
Patent Literature 3 JP 2002-143688 A
Patent Literature 4 JP 2003-154272 A

SUMMARY OF INVENTION

Technical Problem

However, the method described in Patent Literature 1 suffers from a problem of a low quantum efficiency for the water-splitting reaction by irradiation with light. This is because it is highly probable that holes and electrons generated by photoexcitation disappear due to recombination thereof before being used for the electrolytic reaction of water.

Patent Literature 2 describes that, among electrons and holes generated by photoexcitation, the electrons transfer to the conduction band of the second photocatalytic material and the holes transfer to the valence band of the titanium oxide, so that the electron-hole pairs are separated, which decreases the probability of the recombination of the holes and electrons. However, in Patent Literature 2, there is no description about the energy state to be set at the junction plane between the titanium oxide and the second photocatalytic material. When the junction plane between the titanium oxide and the second photocatalytic material forms a Schottky junction, Schottky barriers are formed at the junction plane in the conduction band and the valence band. At this time, among the electrons and holes generated by photoexcitation, the electrons are confined by the Schottky barrier in the conduction band at the junction plane. On the other hand, the holes are accumulated around the junction plane of the valence band by the Schottky barrier that serves as a hole stopper in the valence band at the junction plane. Therefore, the configuration disclosed in Patent Literature 2 has a problem that the probability of recombination of electrons and holes is increased, compared to the case where the titanium oxide and the second photocatalytic material each are used independently.

The photocatalyst thin film described in Patent Literature 3 is made into a gradient film by metal ion doping. However, this configuration has been developed for the purpose of extending the utilized region to the visible light region and improving the light-use efficiency by making a photocatalyst thin film into a gradient film. Therefore, in Patent Literature 3, there is no description about the photocatalytic energy state to be set in the gradient film. This means that the optimization of charge separation and the like is not performed in this photocatalyst thin film.

A multilayer thin film photocatalyst described in Patent Literature 4 has a structure in which two semiconductors, CdS and ZnS, each having a band gap different from the other, are joined, and the semiconductor ZnS further is joined to an electrically conductive base material Pt. Patent Literature 4 describes that since these materials with different band gaps are joined, electrons can transfer to the semiconductor ZnS, and further to the electrically conductive base material Pt along the gradient of the band gaps, and therefore can be coupled easily to hydrogen ions on the electrically conductive base material, which facilitates the generation of hydrogen (Paragraphs [0026] and [0027] in Patent Literature 4). However, in this multilayer thin film photocatalyst, no consideration is given to the Fermi level (vacuum reference level) of each of the materials. Accordingly, although this configuration allows the electrons to transfer along the gradient of the band gaps, it hardly allows the electrons to transfer smoothly.

In view of such conventional problems, it is an object of the present invention to provide a photoelectrochemical cell capable of efficient charge separation between electrons and holes generated by photoexcitation and thus improving the quantum efficiency of the hydrogen evolution reaction by irradiation with light. It is a further object of the present invention to provide an energy system using such a photoelectrochemical cell.

Solution to Problem

In order to achieve the above objects, the present invention provides a photoelectrochemical cell including: a semiconductor electrode including a conductor and a semiconductor layer disposed on the conductor; a counter electrode connected electrically to the conductor; an electrolyte in contact with surfaces of the semiconductor layer and the counter electrode; and a container accommodating the semiconductor electrode, the counter electrode and the electrolyte. In this photoelectrochemical cell, a band edge level $E_{CS}$ of a conduction band, a band edge level $E_{VS}$ of a valence band, and a Fermi level $E_{FS}$ in a surface near-field region of the semiconductor layer, and a band edge level $E_{CJ}$ of a conduction band, a band edge level $E_{VJ}$ of a valence band, and a Fermi level $E_{FJ}$ in a junction plane near-field region of the semiconductor layer with the conductor satisfy, relative to a vacuum level, $E_{CS}-E_{FS} > E_{CJ}-E_{FJ}$, $E_{FS}-E_{VS} < E_{FJ}-E_{VJ}$, $E_{CJ} > -4.44$ eV, and $E_{VS} < -5.67$ eV, and the Fermi level $E_{FS}$ in the surface near-field region of the semiconductor layer and the Fermi level $E_{FJ}$ in the junction plane near-field region of the semiconductor layer with the conductor satisfy, relative to the vacuum level, $-5.67$ eV $< E_{FS} < -4.44$ eV and $-5.67$ eV $< E_{FJ} < -4.44$ eV, respectively.

The present invention further provides an energy system including: the photoelectrochemical cell of the present invention; a hydrogen storage, connected to the photoelectrochemical cell by a first pipe, for storing hydrogen generated inside the photoelectrochemical cell; and a fuel cell, connected to the hydrogen storage by a second pipe, for converting the hydrogen stored in the hydrogen storage into electricity.

Advantageous Effects of Invention

The photoelectrochemical cell of the present invention makes it possible to achieve efficient charge separation between electrons and holes generated by photoexcitation. Thus, the photoelectrochemical cell of the present invention makes it possible to improve the quantum efficiency of the hydrogen evolution reaction by irradiation with light. Since the energy system of the present invention is provided with such a photoelectrochemical cell, efficient power supply is achieved.

DESCRIPTION OF EMBODIMENTS

Hereinafter, the embodiments of the present invention are described in detail with reference to the drawings. The embodiments described below are examples and the present invention is not limited to the following embodiments. Furthermore, in the following embodiments, the same members are indicated with identical numerals and the same descriptions thereof may be omitted.

Embodiment 1

Figure 1:
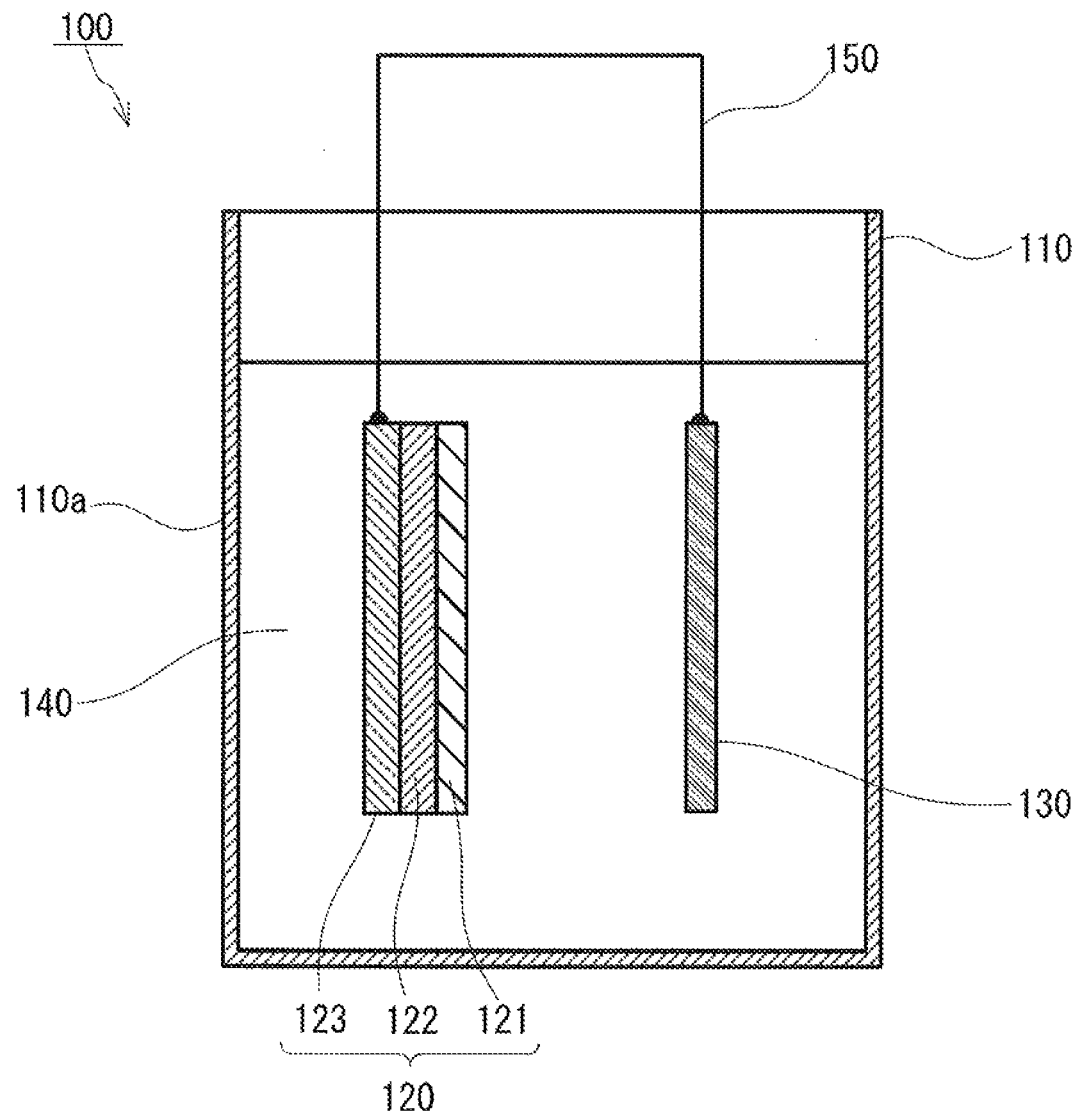
FIG. 1 is a schematic view illustrating a configuration of the photoelectrochemical cell of Embodiment 1 of the present invention.
Figure 2:
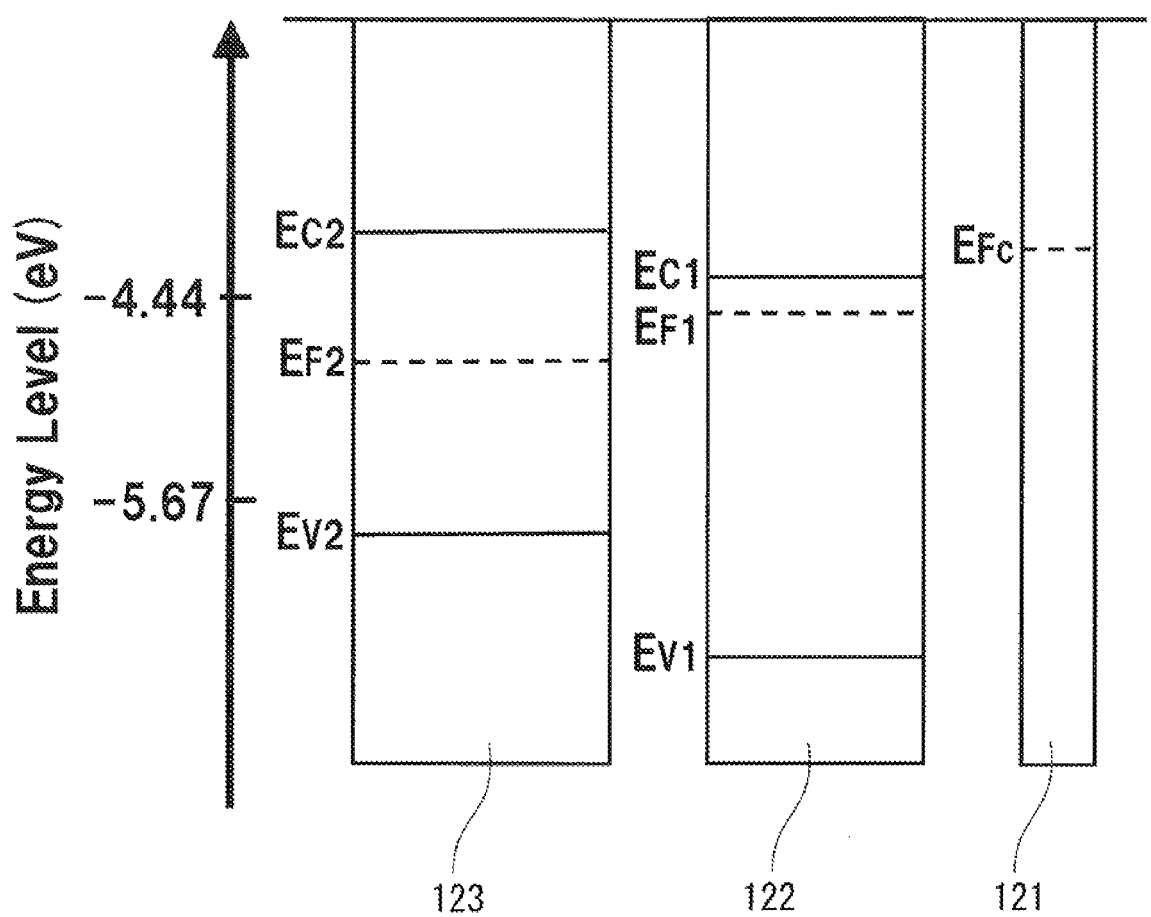
FIG. 2 is a conceptual diagram indicating a band structure of a conductor, a first semiconductor layer and a second semiconductor layer, before being joined, which constitute a semiconductor electrode in the photoelectrochemical cell of Embodiment 1 of the present invention.
Figure 3:
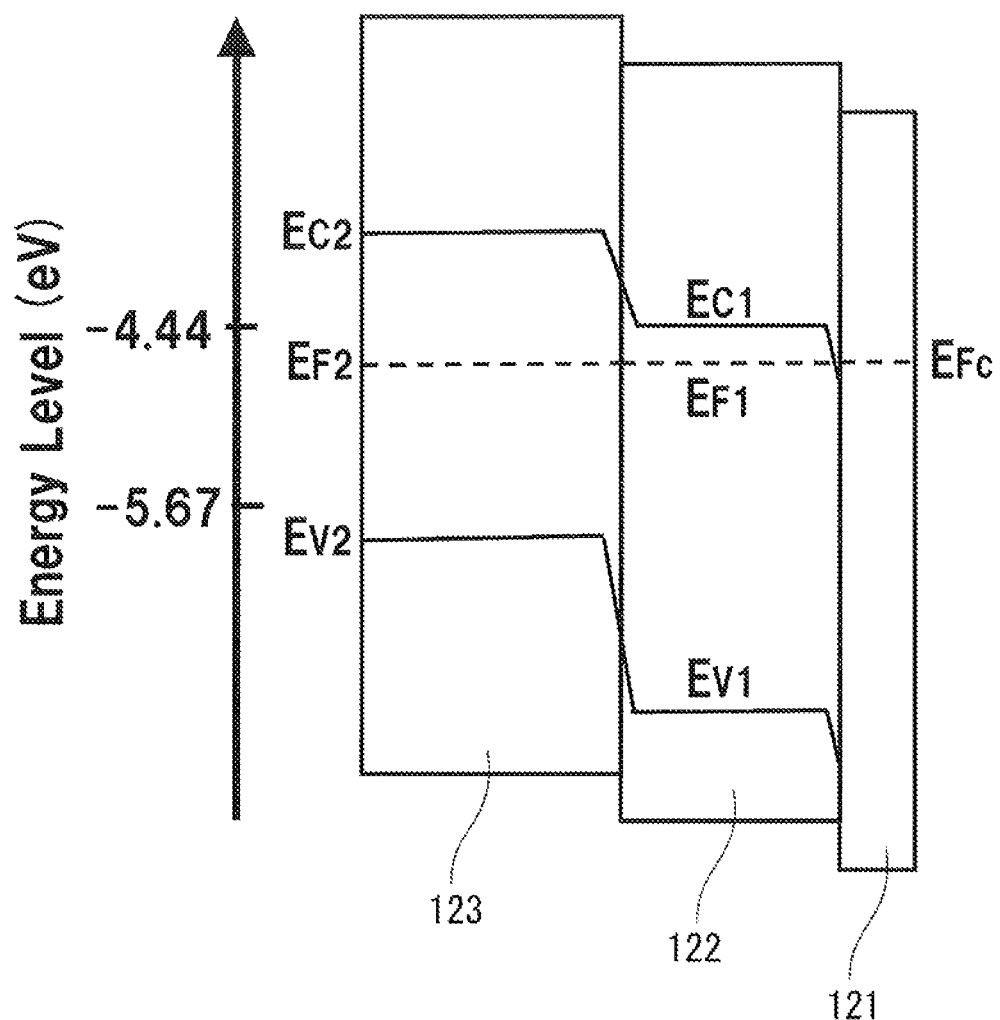
FIG. 3 is a conceptual diagram indicating a band structure of the conductor, the first semiconductor layer and the second semiconductor layer, after being joined, which constitute the semiconductor electrode in the photoelectrochemical cell of Embodiment 1 of the present invention.

The configuration of the photoelectrochemical cell according to Embodiment 1 of the present invention is described with reference to FIG. 1 to FIG. 3. FIG. 1 is a schematic view illustrating the configuration of the photoelectrochemical cell of the present embodiment. FIG. 2 is a conceptual diagram indicating a band structure of a conductor, a first semiconductor layer and a second semiconductor layer, before being joined, which constitute a semiconductor electrode in the photoelectrochemical cell of the present embodiment. FIG. 3 is a conceptual diagram indicating a band structure of the conductor, the first semiconductor layer and the second semiconductor layer, after being joined, which constitute the semiconductor electrode in the photoelectrochemical cell of the present embodiment. In each of FIGS. 2 and 3, the vertical axis indicates energy levels relative to the vacuum level (unit: eV). Here, an embodiment in which n-type semiconductors are used for the first semiconductor layer and the second semiconductor layer that constitute the semiconductor electrode is described.

As illustrated in FIG. 1, a photoelectrochemical cell 100 of the present embodiment includes a semiconductor electrode 120, a counter electrode 130, an electrolyte 140, and a container 110. The counter electrode 130 is an electrode paired with the semiconductor electrode 120. The electrolyte 140 contains water. The container 110 accommodates the semiconductor electrode 120, the counter electrode 130 and the electrolyte 140, and has an opening.

The semiconductor electrode 120 and the counter electrode 130 are disposed inside the container 110 so that the surfaces thereof are in contact with the electrolyte 140. The semiconductor electrode 120 includes a conductor 121, a first semiconductor layer 122 disposed on the conductor 121 and a second semiconductor layer 123 disposed on the first semiconductor layer 122. That is, the semiconductor electrode 120 in the present embodiment is a semiconductor electrode in which the first to Nth (N is an integer of 2 or more) semiconductor layers are formed on the conductor 121, and in this case, N is 2. In the present embodiment, a semiconductor layer that constitutes the semiconductor electrode 120 includes the first semiconductor layer 122 and the second semiconductor layer 123 that are disposed in this order on the conductor 121. A portion of the container 110 facing the second semiconductor layer 123 of the semiconductor electrode 120 that is disposed inside the container 110 (which is, hereinafter, abbreviated as a light incident portion 110a) is made of a material that transmits light, such as sunlight.

The conductor 121 of the semiconductor electrode 120 is connected electrically to the counter electrode 130 by a conducting wire 150. Here, the counter electrode means an electrode that can exchange electrons with a semiconductor electrode without the intermediation of an electrolyte. Accordingly, the counter electrode 130 in the present embodiment only have to be connected electrically to the conductor 121 that constitutes the semiconductor electrode 120. There is no limitation on the positional relationship and the like of the counter electrode 130 with the semiconductor electrode 120.

Next, the band structure of the conductor 121, the first semiconductor layer 122 and the second semiconductor layer 123 in the semiconductor electrode 120 is described in detail.

As indicated in FIG. 2, the first semiconductor layer 122 and the second semiconductor layer 123 satisfy the following relationships, relative to the vacuum level:

$$E_{C2}-E_{F2}>E_{C1}-E_{F1};$$

$$E_{F2}-E_{V2}<E_{F1}-E_{V1};$$

$$E_{C1}>-4.44\text{ eV};$$

$$E_{V2}<-5.67\text{ eV};$$

$$-5.67\text{ eV}<E_{F1}<-4.44\text{ eV}; \text{ and}$$

$$-5.67\text{ eV}<E_{F2}<-4.44\text{ eV}$$

where $E_{C1}$ is the band edge level of the conduction band of the first semiconductor layer 122, $E_{V1}$ is the band edge level of the valence band of the first semiconductor layer 122, $E_{F1}$ is the Fermi level of the first semiconductor layer 122, $E_{C2}$ is the band edge level of the conduction band of the second semiconductor layer 123, $E_{V2}$ is the band edge level of the valence band of the second semiconductor layer 123, and $E_{F2}$ is the Fermi level of the second semiconductor layer 123, respectively.

That is, the semiconductor electrode 120 is set to satisfy the following (1) and (2):
(1) the difference value between the band edge level of the conduction band of the second semiconductor layer 123 and the Fermi level of the second semiconductor layer 123 is greater than that in the first semiconductor layer 122; and
(2) the difference value between the Fermi level of the first semiconductor layer 122 and the band edge level of the valence band of the first semiconductor layer 122 is greater than that in the second semiconductor layer 123.

Here, it is assumed that the first semiconductor layer 122 and the second semiconductor layer 123 are regarded as one semiconductor layer as a whole. In this case, the second semiconductor layer 123 and the first semiconductor layer 122 can be regarded as the surface near-field region of the semiconductor layer and the junction plane near-field region thereof with the conductor 121, respectively. Therefore, it can be said that the semiconductor electrode 120 of the present embodiment is set to satisfy the following (I) and (II), relative to the vacuum level:
(I) the difference value between the band edge level of the conduction band and the Fermi level in the surface near-field region of the semiconductor layer is greater than that in the junction plane near-field region of the semiconductor layer with the conductor; and
(II) the difference value between the Fermi level and the band edge level of the valence band in the junction plane near-field region of the semiconductor layer with the conductor is greater than that in the surface near-field region of the semiconductor layer.

Furthermore, it can be said that the semiconductor electrode 120 of the present embodiment is set to satisfy the following (i) to (iv), relative to the vacuum level:
(i) the band edge level $E_{CJ}$ of the conduction band in the junction plane near-field region of the semiconductor layer with the conductor is higher than −4.44 eV;
(ii) the band edge level $E_{VS}$ of the valence band in the surface near-field region of the semiconductor layer is lower than −5.67 eV;
(i) the Fermi level $E_{FJ}$ in the junction plane near-field region of the semiconductor layer with the conductor satisfies −5.67 eV<$E_{FJ}$<−4.44 eV; and
(iv) the Fermi level $E_{FS}$ in the surface near-field region of the semiconductor layer satisfies −5.67 eV<$E_{FS}$<−4.44 eV.

A common material used as the conductor 121 has a higher Fermi level than the band edge level of its conduction band. Therefore, the difference value between the band edge level of the conduction band of the conductor 121 and the Fermi level thereof (the band edge level of the conduction band−the Fermi level) is a negative value. That is, the above difference value in the conductor 121 is greater than that in the first semiconductor layer 122. Therefore, electrons transfer smoothly from the first semiconductor layer 122 to the conductor 121, as is the case with the transfer from the second semiconductor layer 123 to the first semiconductor layer 122. As a result, the hydrogen production efficiency is further improved.

Furthermore, in the present embodiment, the Fermi level $E_{FC}$ of the conductor 121 is higher than the band edge level $E_{C1}$ of the conduction band of the first semiconductor layer 122, and higher than −4.44 eV. As used herein, a level "higher than −4.44 eV" relative to the vacuum level is equivalent to a level "lower than 0V" relative to the standard hydrogen electrode potential. Therefore, the Fermi level of the conductor 121 is lower than 0V, which is the reduction potential of water. As a result, hydrogen ions are reduced efficiently on the surface of the counter electrode 130 that is connected electrically to the conductor 121, so that hydrogen is generated efficiently.

Furthermore, in the semiconductor electrode 120, the band edge level $E_{V2}$ of the valence band of the second semiconductor layer 123 that is disposed in contact with the electrolyte 140 is lower than −5.67 eV. As used herein, a level "lower than −5.67 eV" relative to the vacuum level is equivalent to a level "higher than 1.23 V" relative to the standard hydrogen electrode potential. Therefore, the band edge level $E_{V2}$ of the valence band of the second semiconductor layer 123 is higher than 1.23 V, which is the oxidation potential of water. As a result, water is oxidized efficiently on the surface of the second semiconductor layer 123, so that oxygen is generated efficiently.

When the first semiconductor layer 122 and the second semiconductor layer 123 are in contact with the electrolyte at a pH of about 7 and a temperature of 25° C., it is desirable that their Fermi levels $E_{F1}$ and $E_{F2}$ be set to satisfy −5.67 eV<$E_{F1}$<−4.44 eV and −5.67 eV<$E_{F2}$<−4.44 eV, respectively, relative to the vacuum level. When a device is designed so that the Fermi levels $E_{F1}$ and $E_{F2}$ of the first semiconductor layer 122 and the second semiconductor layer 123 fall within these ranges, the device can generate hydrogen using water in the form of almost fresh water.

Next, the conductor 121, the first semiconductor layer 122 and the second semiconductor layer 123 are joined to one another. In this case, at the junction plane between the first semiconductor layer 122 and the second semiconductor layer 123, carriers transfer so that the Fermi levels of these layers coincide, as indicated in FIG. 3. This results in bending of the band edge. At this time, the band edge level $E_{C2}$ of the conduction band, the band edge level $E_{V1}$ of the valence band, and the Fermi level $E_{F2}$ of the second semiconductor layer 123 and the band edge level $E_{C1}$ of the conduction band, the band edge level $E_{V1}$ of the valence band, and the Fermi level $E_{F1}$ of the first semiconductor layer 122 satisfy the relationships of $E_{C2}-E_{F2}>E_{C1}-E_{F1}$ and $E_{F2}-E_{V2}<E_{F1}-E_{V1}$, relative to the vacuum level. Therefore, no Schottky barrier is formed at the junction plane between the first semiconductor layer 122 and the second semiconductor layer 123.

In the photoelectrochemical cell 100 of the present embodiment, it is desirable that the Fermi level $E_{F2}$ of the second semiconductor layer 123, the Fermi level $E_{F1}$ of the first semiconductor layer 122, the Fermi level $E_{Fc}$ of the conductor 121, and the Fermi level $E_{Fs}$ of the electrolyte 140 be set to satisfy $E_{FS} \geq E_{Fc} \geq E_{F1} \geq E_{F2}$. Therefore, no Schottky barrier is formed at the junction planes between the first semiconductor layer 122, the second semiconductor layer 123, the conductor 121, and the electrolyte 140. As a result, higher hydrogen production efficiency is achieved.

Also at the junction plane between the conductor 121 and the first semiconductor layer 122, carriers transfer so that their Fermi levels coincide. This causes bending of the band edge around the junction plane of the first semiconductor layer 122. In the present embodiment, the Fermi level $E_{Fc}$ of the conductor 121 is set higher than the Fermi level $E_{F1}$ of the first semiconductor layer 122, relative to the vacuum level. Therefore, the junction between the conductor 121 and the first semiconductor layer 122 is an ohmic contact. In the present embodiment, the Fermi level $E_{Fc}$ of the conductor 121 is set higher than the Fermi level $E_{F1}$ of the first semiconductor layer 122 in order to generate hydrogen more efficiently. However, it is not limited to this. Even if the Fermi level $E_{Fc}$ of the conductor 121 is lower than the Fermi level $E_{F1}$ of the first semiconductor layer 122, it is possible to generate hydrogen.

Desirably, the Fermi level $E_{Fs}$ of the electrolyte 140 satisfies the relationship of $E_{Fs} \geq E_{Fc} \geq E_{F1} \geq E_{F2}$. However, even if this relationship is not satisfied, it is possible to generate hydrogen.

When the above-mentioned semiconductor electrode 120 is placed in contact with the electrolyte 140, the band edge level $E_{C2}$ of the conduction band and the band edge level $E_{V2}$ of the valence band around the surface of the second semiconductor layer 123 are raised at the interface between the second semiconductor layer 123 and the electrolyte 140. Thus, a space charge layer is formed around the surface of the second semiconductor layer 123.

As a comparative embodiment, an embodiment in which the difference value between the band edge level of the conduction band of the second semiconductor layer and the Fermi level of the second semiconductor layer is smaller than that in the first semiconductor layer, relative to the vacuum level, is assumed. In this case, a square well potential is developed in the band edge level of the conduction band inside the second semiconductor layer due to the bending of the band edge of the conduction band around the surface of the second semiconductor layer and the difference in the band edge level of the conduction band between the first semiconductor layer and that of the second semiconductor layer. This square well potential causes the electrons to be accumulated inside the second semiconductor layer. As a result, the probability of the recombination between the electrons and holes generated by photoexcitation increases.

In contrast, in the photoelectrochemical cell 100 of the present embodiment, the difference value between the band edge level of the conduction band of the second semiconductor layer 123 and the Fermi level of the second semiconductor layer 123 is set greater than that in the first semiconductor layer 122. Accordingly, no square well potential as mentioned above occurs in the band edge level of the conduction band inside the second semiconductor layer 123. Therefore, the electrons are not accumulated inside the second semiconductor layer 123 and can transfer toward the side of the first semiconductor layer 122. As a result, the efficiency of charge separation is improved significantly.

As another comparative embodiment, an embodiment in which the difference value between the Fermi level of the first semiconductor layer 122 and the band edge level of the valence band of the first semiconductor layer 122 is smaller than that in the second semiconductor layer 123, relative to the vacuum level, is assumed. In this case, a square well potential is developed in the band edge level of the valence band inside the second semiconductor layer due to the bending of the band edge of the valence band around the surface of the second semiconductor layer and the difference in the band edge level of the valence band between the first semiconductor layer and the second semiconductor layer. This square well potential causes the holes that have been generated inside the second semiconductor layer by photoexcitation to transfer separately in the interface direction with the electrolyte and in the interface direction with the first semiconductor layer.

In contrast, in the photoelectrochemical cell 100 of the present embodiment, the difference value between the Fermi level of the first semiconductor layer 122 and the band edge level of the valence band of the first semiconductor layer 122 is set greater than that in the second semiconductor layer 123. Accordingly, no square well potential as mentioned above occurs in the band edge level of the valence band inside the second semiconductor layer 223. Therefore, the holes are not accumulated inside the second semiconductor layer 123 and can transfer toward the interface direction with the electrolyte. As a result, the efficiency of charge separation is improved significantly.

The photoelectrochemical cell 100 of the present embodiment causes band bending but forms no Schottky barrier at the interface between the first semiconductor layer 122 and the second semiconductor layer 123. As a result, among the electrons and holes generated by photoexcitation inside the second semiconductor layer 123, the electrons transfer to the conduction band of the first semiconductor layer 122, and the holes transfer in the valence band toward the interface direction with the electrolyte. Therefore, an efficient charge separation between the electrons and holes is achieved without being blocked by Schottky barriers. This reduces the probability of the recombination between the electrons and holes generated by photoexcitation inside the second semiconductor layer 123. As a result, the quantum efficiency of the hydrogen evolution reaction by irradiation with light is improved.

Furthermore, in the photoelectrochemical cell 100 of the present embodiment, the Fermi level of the conductor 121 is set higher than the Fermi level of the first semiconductor layer 122. This configuration forms no Schottky barrier also at the junction plane between the conductor 121 and the first semiconductor layer 122. Therefore, the electrons can transfer from the first semiconductor layer 122 to the conductor 121 without being blocked by Schottky barriers. This further reduces the probability of the recombination between the electrons and holes generated by photoexcitation inside the second semiconductor layer 123. As a result, the quantum efficiency of the hydrogen evolution reaction by irradiation with light is further improved.

It should be noted that the Fermi level, the potential (band edge level) at the bottom of the conduction band, and the potential (band edge level) at the top of the valence band of each of the first semiconductor layer 122 and the second semiconductor layer 123 can be calculated using the flat band potential and carrier concentration. The flat band potential and carrier concentration of a semiconductor can be determined from a Mott-Schottky plot obtained by measurement using, as an electrode, the semiconductor to be measured. These energy levels can also be determined physically by ultraviolet photoelectron spectroscopy (UPS) or by measurement using an atmospheric photoelectron spectrometer (AC-3, Riken Keiki Co., Ltd.).

The potential (band edge level) at the top of the valence band of each of the first semiconductor layer 122 and the second semiconductor layer 123 can be calculated using the band gap and the potential at the bottom of the conduction band of each of the semiconductor layer 122 and the second semiconductor layer 123 calculated by the above-mentioned method. Here, the band gap of each of the semiconductor layer 122 and the second semiconductor layer 123 can be obtained from the optical absorption edge observed in the measurement of the light absorption spectrum of the semiconductor to be measured.

The Fermi level of the conductor 121 can be determined, for example, by photoelectron spectroscopy.

Next, the material of each constituent member provided in the photoelectrochemical cell 100 of the present embodiment is described.

First, the materials of the first semiconductor layer 122 and the second semiconductor layer 123 in the present embodiment are described. In the present embodiment, however, the case where n-type semiconductors are used is described.

N-type semiconductors whose band structures satisfy the above-described relationships can be selected for the first semiconductor layer 122 and the second semiconductor 123 layer. Therefore, there is no limitation on the materials for the first semiconductor layer 122 and the second semiconductor layer 123. Preferably, one selected from the group consisting of oxide, nitride and oxynitride is used as the n-type semiconductors for the first semiconductor layer 122 and the second semiconductor layer 123. With the use of these materials, the first semiconductor layer 122 and the second semiconductor layer 123 are prevented from dissolving in the electrolyte 140, in a state where the semiconductor electrode 120 is in contact with the electrolyte 140. Accordingly, the photoelectrochemical cell can operate stably.

In the present embodiment, the junction between the conductor 121 of the semiconductor electrode 120 and the first semiconductor layer 122 is an ohmic contact. Accordingly, for the conductor 121, electrically conductive materials, such as ITO (Indium Tin Oxide) and FTO (Fluorine-doped Tin Oxide), or metals such as Ti, Ni, Ta, Nb, Al and Ag, can be used, for example.

It is preferable that, in the surface of the conductor 121, the area that is not covered by the first semiconductor layer 122 be coated, for example, with an insulating material such as a resin. With such a configuration, the conductor 121 can be prevented from dissolving in the electrolyte 140.

A material with a low overvoltage is used preferably for the counter electrode 130. In the present embodiment, hydrogen is generated at the counter electrode 130. Therefore, Pt, Au, Ag, Fe, or the like is used preferably as the counter electrode 130, for example.

Any electrolyte containing water can be used for the electrolyte 140. The electrolyte containing water may be acidic or alkali. In the case where a solid electrolyte is disposed between the semiconductor electrode 120 and the counter electrode 130, the electrolyte 140 in contact with the surface of the second semiconductor layer 123 of the semiconductor electrode 120 and the surface of the counter electrode 130 can be replaced by pure water for electrolysis.

Next, the operation of the photoelectrochemical cell 100 of the present embodiment is described.

When the second semiconductor layer 123 of the semiconductor electrode 120 disposed inside the container 110 is irradiated with sunlight from the light incident portion 110$a$ of the container 110 in the photoelectrochemical cell 100, electrons are generated in the conduction band and holes are generated in the valence band in the second semiconductor layer 123. The holes generated at this time transfer toward the surface side of the second semiconductor layer 123. Thereby, water is decomposed on the surface of the second semiconductor layer 123 according to the reaction formula (1) below, so that oxygen is generated. On the other hand, the electrons transfer toward the conductor 121 along the bending of the band edge of the conduction band at the interface between the second semiconductor layer 123 and the first semiconductor layer 122 and at the interface between the first semiconductor layer 122 and the conductor 121. The electrons that have transferred to the conductor 121 transfer toward the side of the counter electrode 130 connected electrically to the semiconductor electrode 120 through the conducting wire 150. Thereby, hydrogen is generated on the surface of the counter electrode 130 according to the reaction formula (2) below.

Formula (1):

$$4h^+ + 2H_2O \rightarrow O_2\uparrow + 4H^+ \quad (1)$$

Formula (2):

$$4e^- + 4H^+ \rightarrow 2H_2\uparrow \quad (2)$$

At this time, no Schottky barrier is formed at the junction plane between the first semiconductor layer 122 and the second semiconductor layer 123. Therefore, the electrons can transfer from the second semiconductor layer 123 to the first semiconductor layer 122 without being blocked.

Furthermore, no Schottky barrier is formed also at the junction plane between the first semiconductor layer 122 and the conductor 121. Therefore, the electrons can transfer from the first semiconductor layer 122 to the conductor 121 without being blocked. This reduces the probability of the recombination between the electrons and holes generated by photoexcitation inside the second semiconductor layer 123. As a result, the quantum efficiency of the hydrogen evolution reaction by irradiation with light is further improved.

In the present embodiment, the case where n-type semiconductors are used for the semiconductor electrode 120 have been described. However, also in the case where p-type semiconductors are used, the same operational effects are obtained if the band structures of the first semiconductor layer 122 and the second semiconductor layer 123 satisfy the relationships described in the present embodiment.

When p-type semiconductors are used, oxides, chalcogenides, sulfides, nitrides, oxynitrides, phosphides, and the like, containing barium, strontium, calcium, zirconium, titanium, cerium, gadolinium, gallium, indium, yttrium, ytterbium, and/or scandium, as constituent elements, can be used for the first semiconductor layer 122 and the second semiconductor layer 123.

As a p-type semiconductor for the first semiconductor layer 122, an oxide containing barium, zirconium, and indium, as constituent elements, is used preferably. The use of such an oxide allows the Fermi level $E_{F1}$ of the first semiconductor layer 122 to be set higher than −5.67 eV but lower than −4.44 eV, relative to the vacuum level. That is, the Fermi level of the first semiconductor layer 122 can be set higher than 0 V but lower than 1.23 V, relative to the standard hydrogen electrode potential. The first semiconductor layer 122 may be an oxide of barium, zirconium and indium, a composite oxide thereof, or a mixture of such oxide and composite oxide. The first semiconductor layer 122 may be the above-mentioned compound additionally containing metal ions other than indium ions. An oxide containing barium, zirconium, cerium, and indium, as constituent elements, also can be used suitably.

For example, the p-type semiconductor may contain at least one selected from perovskite-type oxide semiconductors represented by the following general formulae A and B:

$$BaZr_{1-x}M_xO_{3-\alpha} \quad \text{(General Formula A)}$$

where M denotes at least one element selected from trivalent elements, x denotes a numerical value of more than 0 and less than 1 (preferably less than 0.5), and α denotes an amount of oxygen deficiency that is a numerical value of more than 0 and less than 1.5; and $$BaZr_xCe_yM_{1-x-y}O_{3-\alpha} \quad \text{(General Formula B)}$$

where M denotes at least one element selected from trivalent elements, x denotes a numerical value of more than 0 and less than 1, y denotes a numerical value of more than 0 and less than 1, x+y<1 is satisfied, and α denotes an amount of oxygen deficiency that is a numerical value of more than 0 and less than 1.5.

An oxide containing barium, zirconium and indium as constituent elements or an oxide containing barium, zirconium, cerium and indium as constituent elements are also used suitably for the second semiconductor layer 123, as is the case with the first semiconductor layer 122. Furthermore, a material containing at least one selected from semiconductors represented by the above general formula A and general formula B also can be used. The carrier concentration of the p-type semiconductor in the second semiconductor layer 123 preferably is lower than the carrier concentration of the p-type semiconductor in the first semiconductor layer 122. The p-type semiconductor in the second semiconductor layer 123 preferably is one selected from the group consisting of oxide, nitride and oxynitride. With the use of these materials, the second semiconductor layer 123 is prevented from dissolving in the electrolyte 140, even if the second semiconductor layer 123 is irradiated with light in a state where the semiconductor electrode 120 is in contact with the electrolyte 140. Accordingly, the photoelectrochemical cell can operate stably.

When an oxide containing barium, zirconium and indium as constituent elements is used as a p-type semiconductor for the first semiconductor layer 123, an oxide containing, for example, barium, zirconium, cerium and indium as constituent elements can be used as a p-type semiconductor for the second semiconductor layer 123.

In the present embodiment, preferable examples of p-type semiconductors used to form a semiconductor layer include $BaZr_{0.95}In_{0.05}O_{3-\alpha}$, $BaZr_{0.9}In_{0.1}O_{3-\alpha}$, $BaZr_{0.875}In_{0.125}O_{3-\alpha}$, $BaZr_{0.85}In_{0.15}O_{3-\alpha}$, $BaZr_{0.8}In_{0.2}O_{3-\alpha}$, $BaZr_{0.75}In_{0.25}O_{3-\alpha}$, $BaZr_{0.8}Ga_{0.2}O_{3-\alpha}$, $BaZr_{0.9}Ga_{0.1}O_{3-\alpha}$, $BaZr_{0.8}Gd_{0.2}O_{3-\alpha}$, $BaZr_{0.9}Gd_{0.1}O_{3-\alpha}$, $BaZr_{0.8}Y_{0.2}O_{3-\alpha}$, $BaZr_{0.4}Ce_{0.4}In_{0.2}O_{3-\alpha}$, and $BaZr_{0.6}Ce_{0.2}In_{0.2}O_{3-\alpha}$. Table 1 shows the band edge levels ($E_C$) of the conduction bands, the band edge levels ($E_V$) of the valence bands, and the Fermi levels ($E_F$) of these p-type semiconductors. Table 1 also shows the difference values ($E_C$–$E_F$) between the band edge levels of the conduction bands and the Fermi levels and the difference values ($E_F$–$E_V$) between the band edge levels of the valence bands and the Fermi levels.

TABLE 1

| p-type semiconductor | $E_C$ (eV) | $E_C$-$E_F$ (eV) | $E_F$ (eV) | $E_V$ (eV) | $E_F$-$E_V$ (eV) |
|---|---|---|---|---|---|
| $BaZr_{0.95}In_{0.05}O_{3-\alpha}$ | −2.94 | 2.14 | −5.08 | −5.69 | 0.61 |
| $BaZr_{0.9}In_{0.1}O_{3-\alpha}$ | −3.21 | 1.87 | −5.08 | −5.71 | 0.63 |
| $BaZr_{0.875}In_{0.125}O_{3-\alpha}$ | −3.72 | 1.36 | −5.08 | −5.72 | 0.64 |
| $BaZr_{0.85}In_{0.15}O_{3-\alpha}$ | −4.02 | 1.06 | −5.08 | −5.72 | 0.64 |
| $BaZr_{0.8}In_{0.2}O_{3-\alpha}$ | −4.29 | 0.79 | −5.08 | −5.74 | 0.65 |
| $BaZr_{0.75}In_{0.25}O_{3-\alpha}$ | −4.40 | 0.68 | −5.08 | −5.68 | 0.66 |
| $BaZr_{0.8}Ga_{0.2}O_{3-\alpha}$ | −3.71 | 1.37 | −5.08 | −5.77 | 0.69 |
| $BaZr_{0.9}Ga_{0.1}O_{3-\alpha}$ | −3.56 | 1.52 | −5.08 | −5.76 | 0.68 |
| $BaZr_{0.8}Gd_{0.2}O_{3-\alpha}$ | −3.55 | 1.53 | −5.08 | −5.85 | 0.77 |
| $BaZr_{0.9}Gd_{0.1}O_{3-\alpha}$ | −3.04 | 2.04 | −5.08 | −5.84 | 0.76 |
| $BaZr_{0.8}Y_{0.2}O_{3-\alpha}$ | −4.07 | 1.01 | −5.08 | −5.87 | 0.79 |
| $BaZr_{0.4}Ce_{0.4}In_{0.2}O_{3-\alpha}$ | −3.85 | 1.23 | −5.08 | −5.85 | 0.77 |
| $BaZr_{0.6}Ce_{0.2}Gd_{0.2}O_{3-\alpha}$ | −3.30 | 1.78 | −5.08 | −5.90 | 0.82 |

It should be noted that a configuration in which the semiconductor layer provided on the conductor includes the first semiconductor layer and the second semiconductor layer (i.e., a configuration in which two semiconductor layers are provided on the conductor) is shown in the present embodiment. However, the configuration of the photoelectrochemical cell of the present invention is not limited to this. In the photoelectrochemical cell of the present invention, the semiconductor layer provided on the conductor may include the first to Nth (N is an integer of 2 or more) semiconductor layers that are disposed in this order on the conductor. Therefore, it also is possible to use a semiconductor electrode in which three or more semiconductor layers are provided on a conductor. In the configuration in which N semiconductor layers are provided on a conductor, two adjacent layers selected from the first to Nth semiconductor layers are referred to as the (K−1)th (K is an integer of 2 to N) semiconductor layer and the Kth semiconductor layer from the side of the conductor. In this case, the (K−1)th semiconductor layer and the Kth semiconductor layer can be set to satisfy the following relationships, relative to the vacuum level:

$$E_{CK}-E_{FK} > E_{C(K-1)}-E_{F(K-1)};$$

$$E_{FK}-E_{VK} < E_{F(K-1)}-E_{V(K-1)};$$

$$E_{C(K-1)} > -4.44 \text{ eV};$$

$$E_{VK} < -5.67 \text{ eV};$$

$$-5.67 \text{ eV} < E_{F(K-1)} < -4.44 \text{ eV; and}$$

$$-5.67 \text{ eV} < E_{FK} < -4.44 \text{ eV}$$

where $E_{C(K-1)}$ is the band edge level of the conduction band of the (K−1)th semiconductor layer, $E_{V(K-1)}$ is the band edge level of the valence band in the (K−1)th semiconductor layer, $E_{F(K-1)}$ is the Fermi level of the (K−1)th semiconductor layer, $E_{CK}$ is the band edge level of the conduction band of the Kth semiconductor layer, $E_{VK}$ is the band edge level of the valence band of the Kth semiconductor layer, and $E_{FK}$ is the Fermi level of the Kth semiconductor layer, respectively.

The semiconductor electrode may include a conductor and one semiconductor layer disposed on the conductor. In this case, a configuration, in which the semiconductor layer includes at least two elements and at least one of the elements in the semiconductor layer has a concentration increasing or decreasing along the thickness direction of the semiconductor layer, can be adopted. Such a state of the semiconductor layer can be expressed in such a way that the composition is in a gradient. In the case of such a configuration, the surface near-field region of the semiconductor layer and the junction plane near-field region of the semiconductor layer with the conductor can be set to satisfy the following relationships, relative to the vacuum level:

$E_{CS}-E_{FS} > E_{CJ}-E_{FJ};$ $E_{FS}-E_{VS} < E_{FJ}-E_{VJ};$ $E_{CJ} > -4.44\ eV;$ $E_{VS} < -5.67\ eV;$ $-5.67\ eV < E_{FJ} < -4.44\ eV;$ and $-5.67\ eV < E_{FS} < -4.44\ eV$ where $E_{CJ}$ is the band edge level of the conduction band in the junction plane near-field region of the semiconductor layer with the conductor, $E_{VJ}$ is the band edge level of the valence band in the junction plane near-field region of the semiconductor layer with the conductor, $E_{FJ}$ is the Fermi level in the junction plane near-field region of the semiconductor layer with the conductor, $E_{CS}$ is the band edge level of the conduction band in the surface near-field region of the semiconductor layer, $E_{VS}$ is the band edge level of the valence band in the surface near-field region of the semiconductor layer, and $E_{FS}$ is the Fermi level in the surface near-field region of the semiconductor layer, respectively.

Embodiment 2

Figure 4:
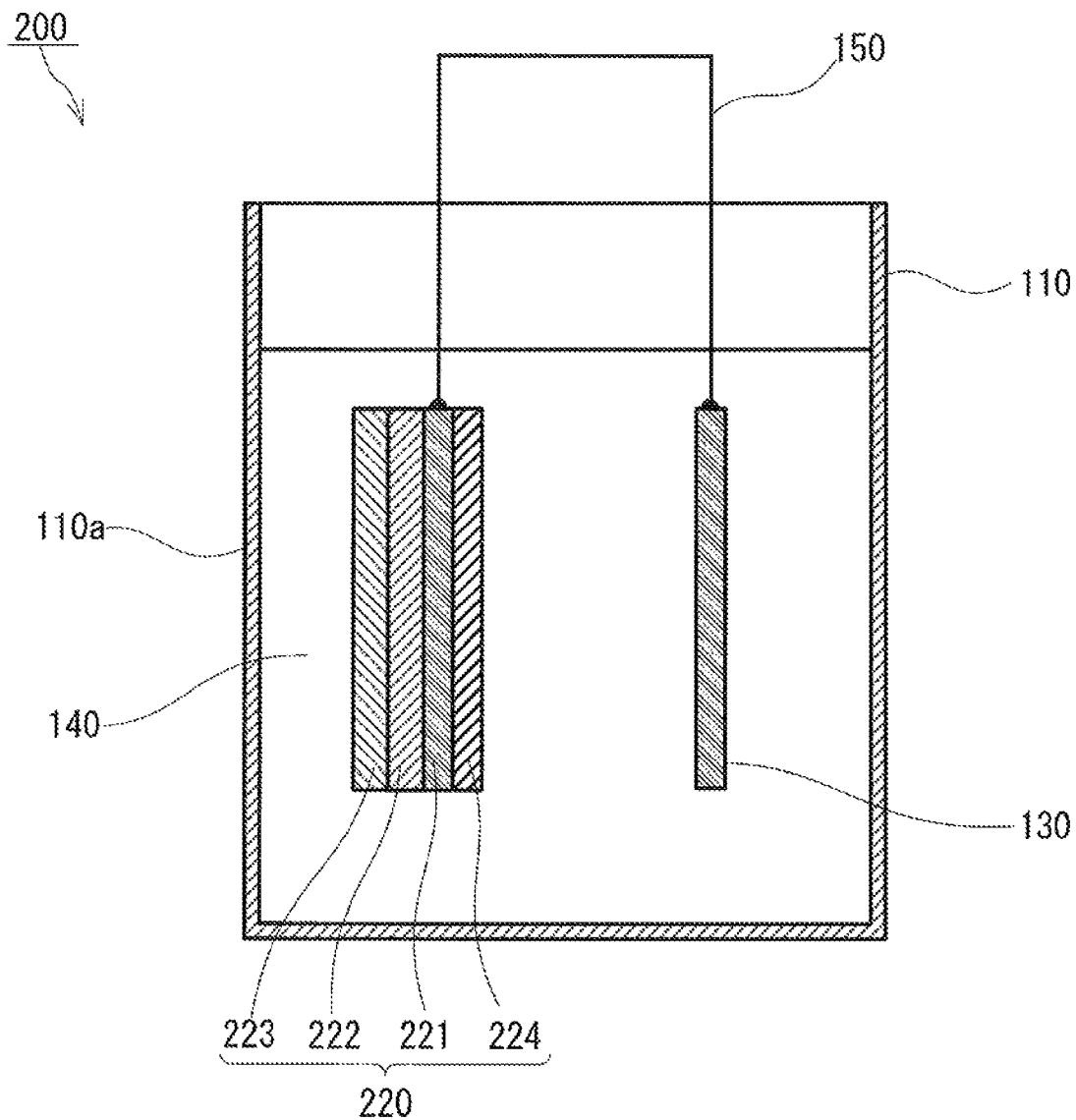
FIG. 4 is a schematic view illustrating a configuration of the photoelectrochemical cell of Embodiment 2 of the present invention.

The configuration of the photoelectrochemical cell according to Embodiment 2 of the present invention is described with reference to FIG. 4. FIG. 4 is a schematic view illustrating the configuration of the photoelectrochemical cell of the present embodiment.

In a photoelectrochemical cell 200 of the present embodiment, a semiconductor electrode 220 includes a conductor 221, a first semiconductor layer 222 disposed on the conductor 221, and a second semiconductor layer 223 disposed on the first semiconductor layer 222. The semiconductor electrode 220 further includes an insulation layer 224 disposed on the surface of the conductor 221 opposite to the surface on which the first semiconductor layer 222 is disposed. The conductor 221, the first semiconductor layer 222 and the second semiconductor layer 223, respectively, have the same structures as those of the conductor 121, the first semiconductor layer 122 and the second semiconductor layer 123 in Embodiment 1. The insulation layer 224 is formed, for example, of resin or glass. This insulation layer 224 can prevent the conductor 221 from dissolving in the electrolyte 140. In the present embodiment, a configuration in which an insulation layer as mentioned above is additionally provided on a semiconductor electrode including two semiconductor layers as shown in Embodiment 1 is adopted. Such an insulation layer can be employed also for each of the semiconductor electrodes described in Embodiment 1, one including three or more semiconductor layers and the other including a semiconductor layer with a gradient composition.

Embodiment 3

Figure 5:
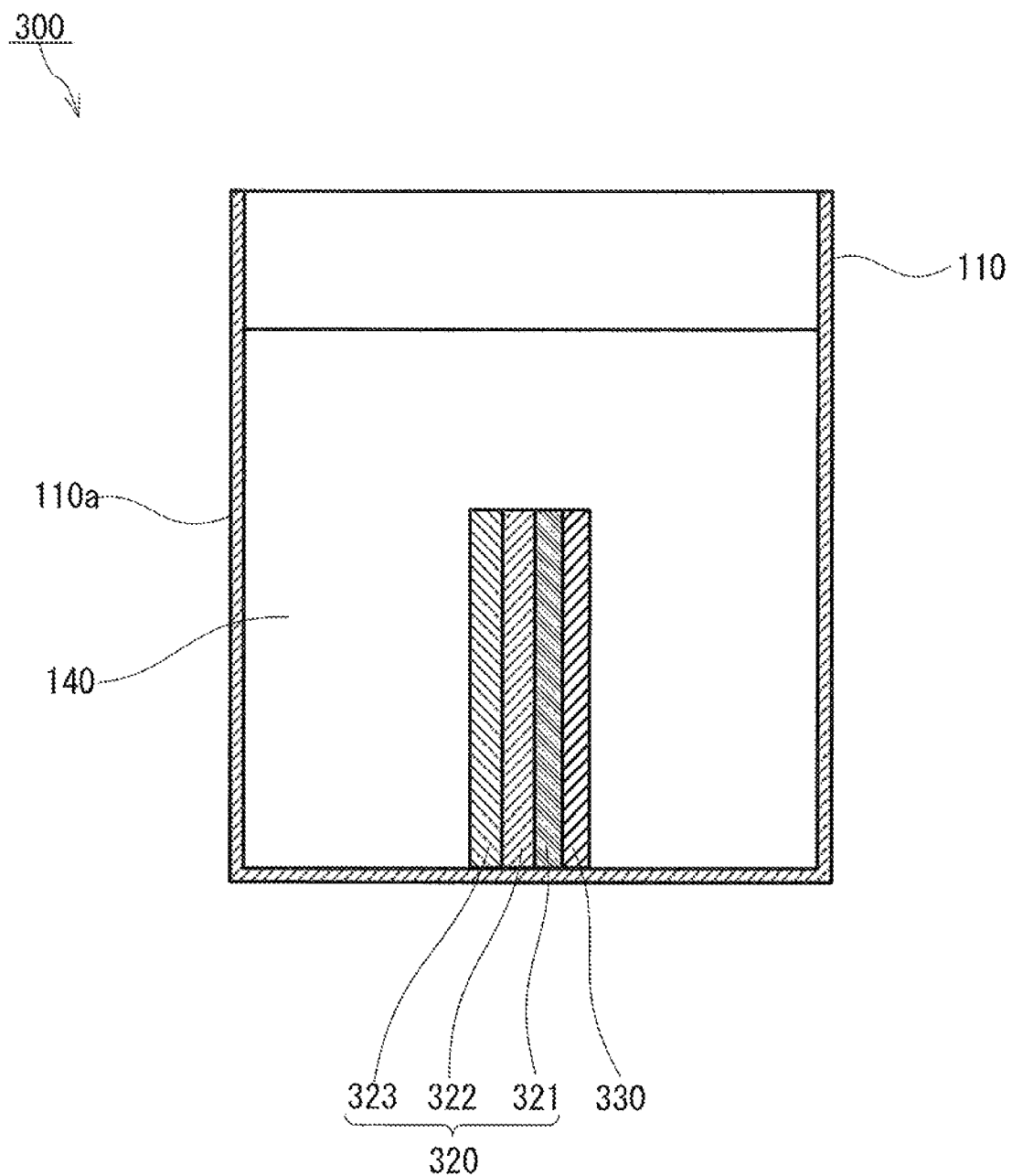
FIG. 5 is a schematic view illustrating a configuration of the photoelectrochemical cell of Embodiment 3 of the present invention.

The configuration of the photoelectrochemical cell according to Embodiment 3 of the present invention is described with reference to FIG. 5. FIG. 5 is a schematic view illustrating the configuration of the photoelectrochemical cell of the present embodiment.

In a photoelectrochemical cell 300 of the present embodiment, a semiconductor electrode 320 includes a conductor 321, a first semiconductor layer 322 disposed on the conductor 321 and a second semiconductor layer 323 disposed on the first semiconductor layer 322. On the other hand, a counter electrode 330 is disposed on the conductor 321 (on the surface of the conductor 321 opposite to the surface on which the first semiconductor layer 322 is disposed). The conductor 321, the first semiconductor layer 322 and the second semiconductor layer 323, respectively, have the same structures as those of the conductor 121, the first semiconductor layer 122 and the second semiconductor layer 123 in Embodiment 1.

As is the case with the present embodiment, the configuration in which the counter electrode 330 is disposed on the conductor 321 can eliminate the need for a conducting wire for connecting the semiconductor electrode 320 electrically to the counter electrode 330. This can eliminate the ohmic loss derived from the conducting wire, therefore further improving the quantum efficiency of the hydrogen evolution reaction by irradiation with light. Furthermore, with such a configuration, the semiconductor electrode 320 can be connected electrically to the counter electrode 330 by a simple and easy process. The present embodiment shows a configuration in which the counter electrode 330 is disposed on the surface of the conductor 321 opposite to the surface on which the first semiconductor layer 322 is disposed. However, the counter electrode 330 is not limited to this configuration, and the counter electrode 330 can be disposed also on the same surface on which the first semiconductor layer 322 is disposed. In the present embodiment, the above configuration in which a counter electrode is disposed on a conductor in a photoelectrochemical cell including two semiconductor layers as shown in Embodiment 1 is adopted. Such a configuration can be employed also for each of the semiconductor electrodes described in Embodiment 1, one including three or more semiconductor layers and the other including a semiconductor layer with a gradient composition.

Embodiment 4

Figure 6:
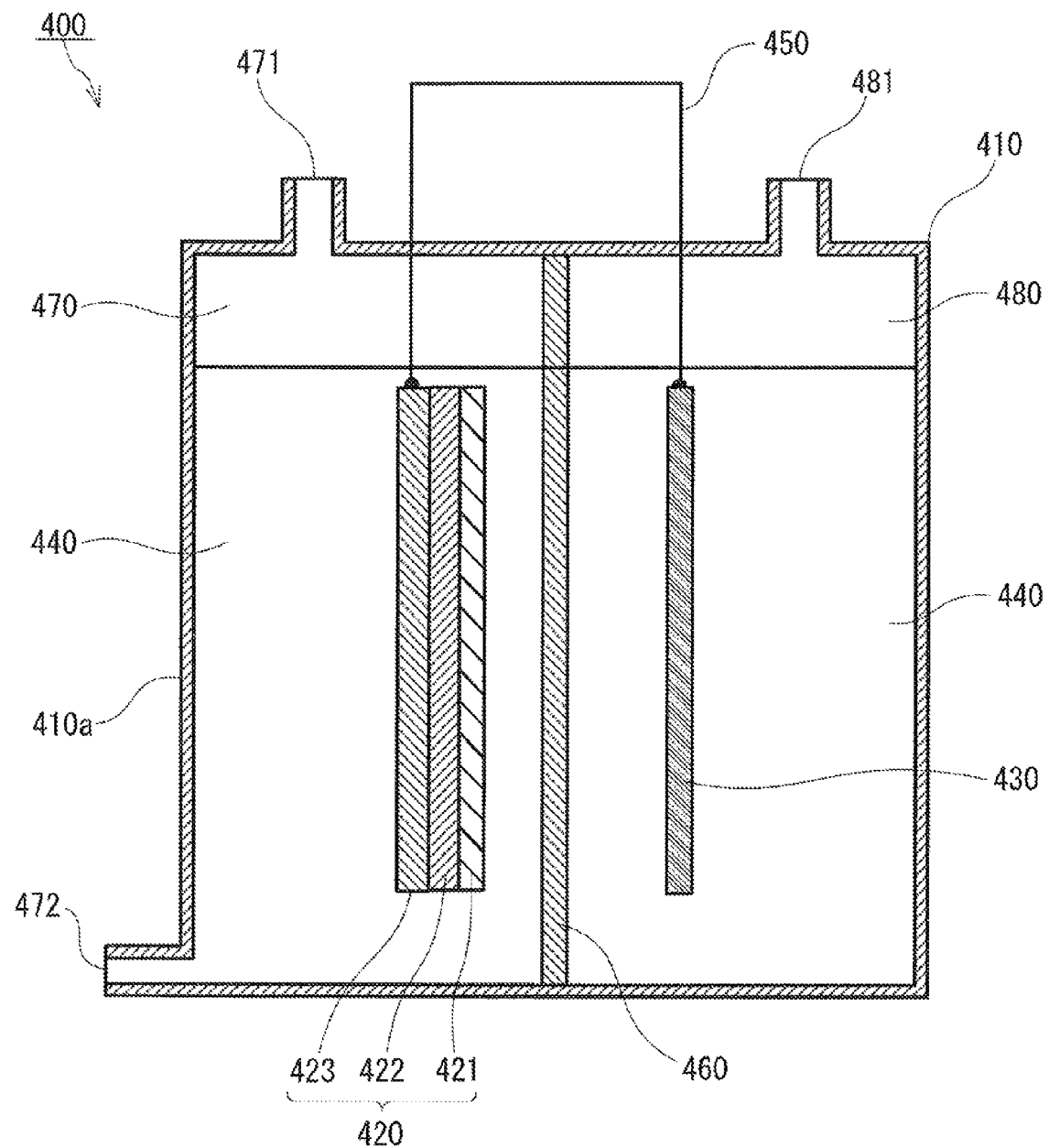
FIG. 6 is a schematic view illustrating a configuration of the photoelectrochemical cell of Embodiment 4 of the present invention.

The configuration of the photoelectrochemical cell according to Embodiment 4 of the present invention is described with reference to FIG. 6. FIG. 6 is a schematic view illustrating the configuration of the photoelectrochemical cell of the present embodiment.

As indicated in FIG. 6, a photoelectrochemical cell 400 of the present embodiment includes a housing (container) 410, a semiconductor electrode 420, a counter electrode 430 and a separator 460. The separator 460 separates the inside of the housing 410 into two chambers: a first chamber 470 and a second chamber 480. An electrolyte 440 containing water is contained in each of the first chamber 470 and the second chamber 480.

The semiconductor electrode 420 is disposed at a position in contact with the electrolyte 440 inside the first chamber 470. The semiconductor electrode 420 includes a conductor 421, a first semiconductor layer 422 disposed on the conductor 421 and a second semiconductor layer 423 disposed on the first semiconductor layer 422. Furthermore, the first chamber 470 includes a first gas outlet 471 for discharging oxygen generated inside the first chamber 470 and a water inlet 472 for supplying water into the first chamber 470. A portion of the housing 410 that faces the second semiconductor layer 423 of the semiconductor electrode 420 disposed inside the first chamber 470 (hereinafter, abbreviated as a light incident portion 410a) is made of a material that transmits light such as sunlight.

On the other hand, the counter electrode 430 is disposed inside the second chamber 480 at a position in contact with the electrolyte 440. The second chamber 480 includes a second gas outlet 481 for discharging hydrogen generated inside the second chamber 480.

The conductor 421 of the semiconductor electrode 420 is connected electrically to the counter electrode 430 by a conducting wire 450.

The conductor 421, the first semiconductor layer 422 and the second semiconductor layer 423 of the semiconductor electrode 420 in the present embodiment, respectively, have the same structures as those of the conductor 121, the first semiconductor layer 122 and the second semiconductor layer 123 of the semiconductor electrode 120 in Embodiment 1. Accordingly, the semiconductor electrode 420 has the same operational effects as those of the semiconductor electrode 120 of Embodiment 1. Furthermore, the counter electrode 430 and the electrolyte 440 respectively are the same as the counter electrode 130 and the electrolyte 140 in Embodiment 1.

The separator 460 is formed of a material that allows the electrolyte 440 to permeate itself and has a function of blocking gas generated inside each of the first chamber 470 and the second chamber 480. Examples of the material of the separator 460 include a solid electrolyte such as a solid polymer electrolyte. As the solid polymer electrolyte, an ion exchange membrane such as Nafion (registered trademark) can be mentioned, for example. After the internal space of the container is separated into two areas using such a separator, the electrolyte and the surface of the semiconductor electrode (i.e., the semiconductor layer) are made in contact in one of the areas while the electrolyte and the surface of the counter electrode are made in contact in the other area. With such a configuration, oxygen and hydrogen generated inside the container can be separated easily.

It should be noted that the photoelectrochemical cell 400 using the semiconductor electrode 420 having the same structure as that of the semiconductor electrode 120 in Embodiment 1 is described in the present embodiment. However, it also is possible to use, for the photoelectrochemical cell 400, a semiconductor electrode including three or more semiconductor layers or a semiconductor electrode including a semiconductor layer with a gradient composition, described also in Embodiment 1, instead of the semiconductor electrode 420.

Embodiment 5

Figure 7:
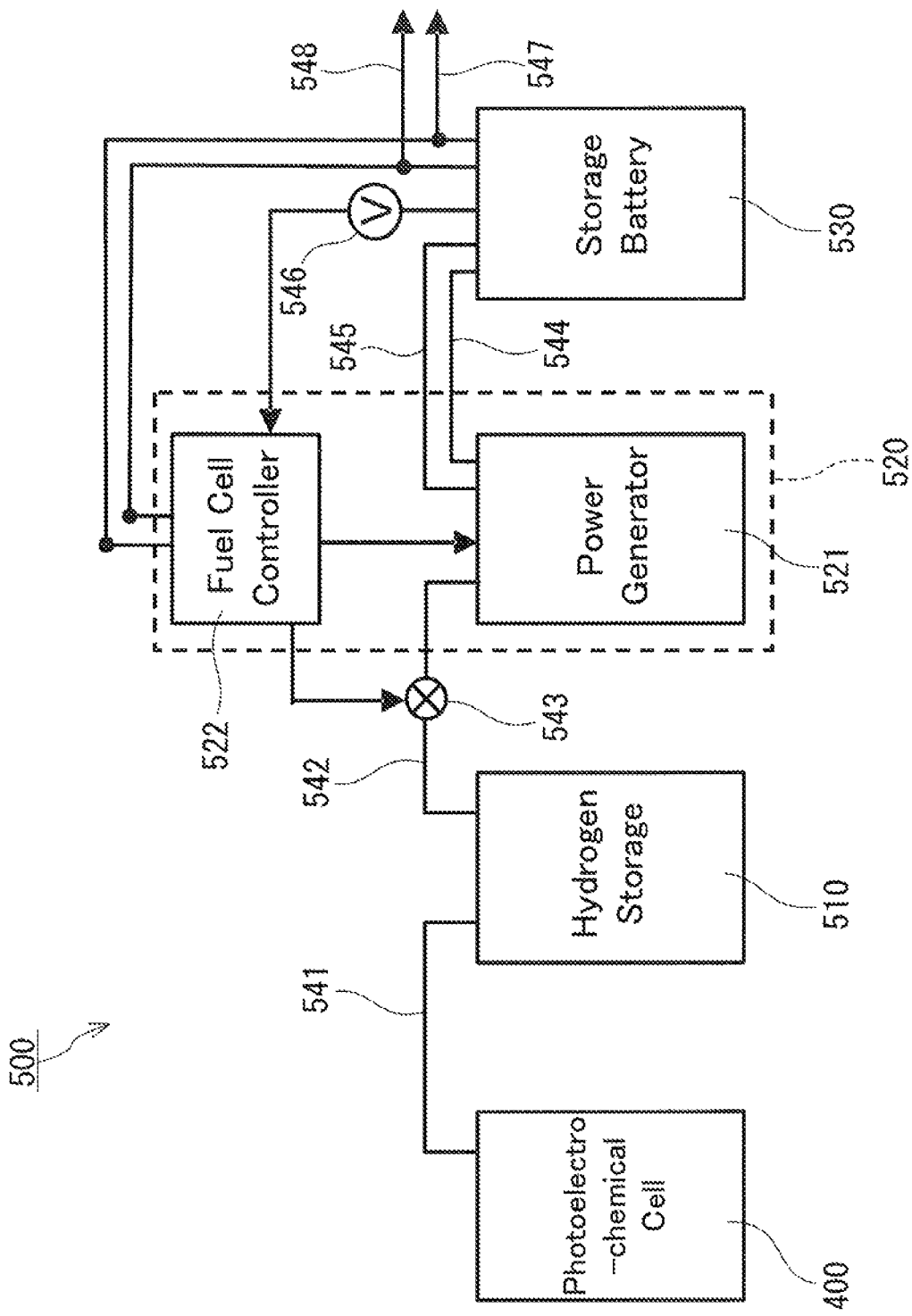
FIG. 7 is a schematic view illustrating a configuration of the energy system of Embodiment 5 of the present invention.

The configuration of the energy system according to Embodiment 5 of the present invention is described with reference to FIG. 7. FIG. 7 is a schematic view illustrating the configuration of the energy system of the present embodiment.

As indicated in FIG. 7, an energy system 500 of the present embodiment includes the photoelectrochemical cell 400, a hydrogen storage 510, a fuel cell 520 and a storage battery 530.

The photoelectrochemical cell 400 is the photoelectrochemical cell described in Embodiment 4 and the specific configuration thereof is as illustrated in FIG. 6. Therefore, detailed descriptions thereof are omitted.

The hydrogen storage 510 is connected to the second chamber 480 (see FIG. 6) of the photoelectrochemical cell 400 by a first pipe 541. The hydrogen storage 510 can be constituted, for example, by a compressor for compressing the hydrogen generated in the photoelectrochemical cell 400 and a high-pressure hydrogen tank for storing the hydrogen compressed by the compressor.

The fuel cell 520 includes a power generator 521 and a fuel cell controller 522 for controlling the power generator 521. The fuel cell 520 is connected to the hydrogen storage 510 by a second pipe 542. The second pipe 542 is provided with a shutoff valve 543. For example, a solid polymer electrolyte fuel cell can be used as the fuel cell 520.

The positive electrode and the negative electrode of the storage battery 530 respectively are connected electrically to the positive electrode and the negative electrode of the power generator 521 in the fuel cell 520 by a first line 544 and a second line 545. The storage battery 530 is provided with a capacity meter 546 for measuring the remaining capacity of the storage battery 530. A lithium ion battery can be used as the storage battery 530, for example.

Next, the operation of the energy system 500 according to the present embodiment is described with reference also to FIG. 6.

When the surface of the second semiconductor layer 423 of the semiconductor electrode 420 disposed inside the first chamber 470 is irradiated with sunlight through the light incident portion 410a of the photoelectrochemical cell 400, electrons and holes are generated inside the second semiconductor layer 423. The holes generated at this time transfer toward the surface side of the second semiconductor layer 423. Thus, water is decomposed on the surface of the second semiconductor layer 423 according to the above reaction formula (1), so that oxygen is generated.

On the other hand, the electrons transfer toward the conductor 421 along the bending of the band edge of the conduction band at the interface between the second semiconductor layer 423 and the first semiconductor layer 422 and at the interface between the first semiconductor layer 422 and the conductor 421. The electrons that have transferred to the conductor 421 transfer toward the side of the counter electrode 430 connected electrically to the conductor 421 through the conducting wire 450. Thus, hydrogen is generated on the surface of the counter electrode 430 according to the above reaction formula (2).

At this time, no Schottky barrier is formed at the junction plane between the second semiconductor layer 423 and the first semiconductor layer 422, as is the case with the semiconductor electrode 120 in Embodiment 1. Therefore, the electrons can transfer from the second semiconductor layer 423 to the first semiconductor layer 422 without being blocked. Furthermore, no Schottky barrier is formed also at the junction plane between the first semiconductor layer 422 and the conductor 421. Therefore, the electrons can transfer to the conductor 421 without being blocked. Accordingly, the probability of the recombination between the electrons and holes generated by photoexcitation inside the first semiconductor layer 423 is reduced. As a result, the quantum efficiency of the hydrogen evolution reaction by irradiation with light is improved.

Oxygen generated inside the first chamber 470 is discharged from the first gas outlet 471 to the outside of the photoelectrochemical cell 400. On the other hand, hydrogen generated inside the second chamber 480 is supplied into the hydrogen storage 510 through the second gas outlet 481 and the first pipe 541.

In generating power in the fuel cell 520, the shutoff valve 543 is opened according to signals from the fuel cell controller 522, so that the hydrogen stored inside the hydrogen storage 510 is supplied to the power generator 521 of the fuel cell 520 through the second pipe 542.

The electricity generated in the power generator 521 of the fuel cell 520 is stored inside the storage battery 530 through the first line 544 and the second line 545. The electricity stored inside the storage battery 530 is supplied to households, enterprises, and the like through a third line 547 and a fourth line 548.

According to the photoelectrochemical cell 400, it is possible to improve the quantum efficiency of the hydrogen evolution reaction by irradiation with light. Thus, the energy system 500 of the present embodiment provided with this photoelectrochemical cell 400 can provide an efficient power supply.

In the present embodiment, an energy system using the photoelectrochemical cell 400 described in Embodiment 4 is exemplified. The same effects can be obtained also when the photoelectrochemical cells 100, 200 and 300 described in Embodiments 1 to 3 each are used.

EXAMPLES

Hereafter, examples of the present invention are described specifically.

Example 1

As Example 1, a photoelectrochemical cell having the same configuration as that of the photoelectrochemical cell 200 indicated in FIG. 4 was produced. The photoelectrochemical cell of Example 1 is described below with reference to FIG. 4.

The photoelectrochemical cell 200 of Example 1 was provided with a rectangular glass container (container 110) with an opening in the upper part, the semiconductor electrode 220 and the counter electrode 130. The glass container 110 held therein 0.01 mol/L Na$_2$SO$_3$ aqueous solution containing 0.01 mol/L Na$_2$S as the electrolyte 140.

The semiconductor electrode 220 was produced according to the following procedure.

First, a 150 nm-thick ITO film (sheet resistance 10 Ω/sq.) as the conductor 221 was formed by sputtering on a 1 cm-square glass substrate as the insulation layer 224. Next, a 300 nm-thick BaZr$_{0.8}$In$_{0.2}$O$_{3-\alpha}$ film as the first semiconductor layer 222 was formed by electrodeposition on the conductor 221. Finally, a 1 μm-thick BaZr$_{0.9}$In$_{0.1}$O$_{3-\alpha}$ film as the second semiconductor layer 223 was formed also by electrodeposition on the first semiconductor layer 222. The semiconductor electrode 220 was disposed so that the surface of the second semiconductor layer 223 faced the light incident surface 110a of the glass container 110.

A platinum plate was used as the counter electrode 130. A portion of the conductor 221 of the semiconductor electrode 220 was connected electrically to the counter electrode 130 by the conducting wire 150. The current flowing between the semiconductor electrode 220 and the counter electrode 130 was measured with an ammeter.

Comparative Example 1

The first semiconductor layer 222 was not provided on the conductor 221 but a BaZr$_{0.9}$In$_{0.1}$O$_{3-\alpha}$ film as the second semiconductor layer 223 was provided thereon in the semiconductor electrode 220 of Example 1. Except for this point, a photoelectrochemical cell of Comparative Example 1 was produced by the same procedure as used for the photoelectrochemical cell 200 of Example 1.

Comparative Example 2

A 1 μm-thick film of titanium oxide, which is an n-type semiconductor, was provided instead of the BaZr$_{0.9}$In$_{0.1}$O$_{3-\alpha}$ film provided as the second semiconductor layer 223 in the semiconductor electrode 220 of Example 1. Except for this point, a photoelectrochemical cell of Comparative Example 2 was produced by the same procedure as used in Example 1.

Comparative Example 3

A 1 μm-thick Cu$_2$O film was provided as the second semiconductor layer 223 instead of the BaZr$_{0.9}$In$_{0.1}$O$_{3-\alpha}$ film in the semiconductor electrode 220 of Example 1. Except for this point, a photoelectrochemical cell of Comparative Example 3 was produced by the same procedure as used in Example 1.

Example 2

As Example 2, a photoelectrochemical cell having the same configuration as that of the photoelectrochemical cell 100 indicated in FIG. 1 was produced. The photoelectrochemical cell of Example 2 is described below with reference to FIG. 1.

In the photoelectrochemical cell 100 of the present example, a Ti substrate was used as the conductor 121. The photoelectrochemical cell 100 of the present example is different from the photoelectrochemical cell 200 of Example 1 in that a 500 nm-thick BaZr$_{0.8}$In$_{0.2}$O$_{3-\alpha}$ film as the first semiconductor layer 122 was formed by electrodeposition on the conductor 121, a glass substrate as an insulation layer was not provided on the back surface of the conductor 121, and the back surface of the conductor 121 was coated with fluororesin. Since the configuration of the photoelectrochemical cell 100 of the present example is the same as that of the photoelectrochemical cell 200 of Example 1 except for these differences, the description thereof is omitted.

Example 3

As Example 3, a photoelectrochemical cell having the same configuration as that of the photoelectrochemical cell 300 indicated in FIG. 5 was produced. The photoelectrochemical cell of Example 3 is described below with reference to FIG. 5.

The semiconductor electrode 320 and the counter electrode 330 were produced according to the following procedure.

As the conductor 321, a 1 cm-square Ti substrate was used. A 500 nm-thick BaZr$_{0.4}$Ce$_{0.4}$In$_{0.2}$O$_{3-\alpha}$ film as the first semiconductor layer 322 was formed by electrodeposition on this Ti substrate. Next, a 1 μm-thick BaZr$_{0.9}$In$_{0.1}$O$_{3-\alpha}$ film as the second semiconductor layer 323 was formed by electrodeposition on the first semiconductor layer 322, in the same manner as in Example 1. Finally, a 10 nm-thick Pt film as the counter electrode 330 was formed by sputtering on the back surface of the Ti substrate as the conductor 321. The semiconductor electrode 320 was disposed so that the surface of the second semiconductor layer 323 faced the light incident surface 110a of the glass container 110.

Example 4

As Example 4, a photoelectrochemical cell including a semiconductor electrode in which first to third semiconductor layers were provided in this order on a conductor was produced. Specifically, the photoelectrochemical cell of Example 4 has a configuration in which the third semiconductor layer is additionally provided on the second semiconductor layer 223 in the semiconductor electrode 220 of the photoelectrochemical cell 200 indicated in FIG. 4. The photoelectrochemical cell of Example 4 is described below with reference to FIG. 4.

First, a 150 nm-thick ITO film (sheet resistance 10 Ω/sq.) as the conductor 221 was formed by sputtering on a 1 cm-square glass substrate as the insulation layer 224. Next, a 300 nm-thick $BaZr_{0.8}In_{0.2}O_{3-\alpha}$ film as the first semiconductor layer 222 was formed by electrodeposition on the conductor 221. Next, a 500 nm-thick $BaZr_{0.9}In_{0.1}O_{3-\alpha}$ film as the second semiconductor layer 223 was formed also by electrodeposition on the first semiconductor layer 222. Finally, a 1 μm-thick $BaZr_{0.95}In_{0.05}O_{3-\alpha}$ film as the third semiconductor layer was formed also by electrodeposition on the second semiconductor layer 223. The semiconductor electrode 220 was disposed so that the surface of the third semiconductor layer faced the light incident surface 110a of the glass container 110.

Since the configuration of the photoelectrochemical cell of Example 4 is the same as that of the photoelectrochemical cell 200 of Example 1 except for these differences, the description thereof is omitted.

Example 5

A photoelectrochemical cell of Example 5 was produced by the same procedure as used in Example 1, except that the materials of the first semiconductor layer 222 and the second semiconductor layer 223 were replaced by n-type semiconductors in the semiconductor electrode 220 of Example 1. As the first semiconductor layer 222, a 300 nm-thick $TiO_2$ film was formed by electrodeposition. As the second semiconductor layer 223, a 500 nm-thick CdS film formed by sputtering on the first semiconductor layer 222 was used. The band edge level of the conduction band of titanium oxide was −4.24 eV, the band edge level of the valence band thereof was −7.44 eV, and the Fermi level thereof was −4.84 eV. The band edge level of the conduction band of CdS was −4.04 eV, the band edge level of the valence band thereof was −6.54 eV, and the Fermi level thereof was −5.24 eV. It should be noted that the values of the Fermi levels, the band edge levels of the conduction bands, and the band edge levels of the valence bands are indicated herein relative to the vacuum level. It should be noted that a vacuum level of −4.44 eV corresponds to a standard hydrogen electrode potential of 0 V.

Tables 2 and 3 below indicate the materials, the Fermi levels (unit: eV), the band edge levels (unit: eV) of the conduction bands, and the band edge levels (unit: eV) of the valence bands of the conductor, the p-type semiconductor and n-type semiconductor used for the production of the semiconductor electrode in each of the photoelectrochemical cells of Examples 1 to 5 and Comparative Examples 1 to 3. It should be noted that the Fermi levels of the semiconductors indicated herein are the values relative to the vacuum level. However, given that the pH value of the actually used electrolyte is about 7, the Fermi levels of the semiconductors are considered to be pulled down to the same level as the Fermi level of the electrolyte at a pH of 7 and a temperature of 25° C. by that Fermi level of the electrolyte.

TABLE 2

| | | Conductor | First semiconductor layer | Second semiconductor layer | Third semiconductor layer |
|---|---|---|---|---|---|
| Example 1 | Material composition | ITO | $BaZr_{0.8}In_{0.2}O_{3-a}$ | $BaZr_{0.9}In_{0.1}O_{3-a}$ | — |
| | Fermi level | −4.24 eV | −5.08 eV | −5.08 eV | — |
| | Conduction band | — | −4.29 eV | −3.21 eV | — |
| | Valence band | — | −5.74 eV | −5.71 eV | — |
| Example 2 | Material composition | Ti | $BaZr_{0.8}In_{0.2}O_{3-a}$ | $BaZr_{0.9}In_{0.1}O_{3-a}$ | — |
| | Fermi level | −4.33 eV | −5.08 eV | −5.08 eV | — |
| | Conduction band | — | −4.29 eV | −3.21 eV | — |
| | Valence band | — | −5.74 eV | −5.71 eV | — |
| Example 3 | Material composition | Ti | $BaZr_{0.4}Ce_{0.4}In_{0.2}O_{3-a}$ | $BaZr_{0.9}In_{0.1}O_{3-a}$ | — |
| | Fermi level | −4.33 eV | −5.08 eV | −5.08 eV | — |
| | Conduction band | — | −3.85 eV | −3.21 eV | — |
| | Valence band | — | −5.85 eV | −5.71 eV | — |
| Example 4 | Material composition | ITO | $BaZr_{0.8}In_{0.2}O_{3-a}$ | $BaZr_{0.9}In_{0.1}O_{3-a}$ | $BaZr_{0.95}In_{0.05}O_{3-a}$ |
| | Fermi level | −4.24 eV | −5.08 eV | −5.08 eV | −5.08 eV |
| | Conduction band | — | −4.29 eV | −3.21 eV | −2.94 eV |
| | Valence band | — | −5.74 eV | −5.71 eV | −5.69 eV |
| Example 5 | Material composition | ITO | $TiO_2$ | CdS | — |
| | Fermi level | −4.24 eV | −4.84 eV | −5.24 eV | — |
| | Conduction band | — | −4.24 eV | −4.04 eV | — |
| | Valence band | — | −7.44 eV | −6.54 eV | — |

TABLE 3

|  |  | Conductor | First semiconductor layer | Second semiconductor layer |
|---|---|---|---|---|
| Comparative Example 1 | Material composition | ITO | — | $BaZr_{0.9}In_{0.1}O_{3-a}$ |
|  | Fermi level | −4.24 eV | — | −5.08 eV |
|  | Conduction band | — | — | −3.21 eV |
|  | Valence band | — | — | −5.71 eV |
| Comparative Example 2 | Material composition | ITO | $BaZr_{0.8}In_{0.2}O_{3-a}$ | $TiO_2$ |
|  | Fermi level | −4.24 eV | −5.08 eV | −4.84 eV |
|  | Conduction band | — | −4.29 eV | −4.24 eV |
|  | Valence band | — | −5.74 eV | −7.44 eV |
| Comparative Example 3 | Material composition | ITO | $BaZr_{0.8}In_{0.2}O_{3-a}$ | $Cu_2O$ |
|  | Fermi level | −4.24 eV | −5.08 eV | −4.99 eV |
|  | Conduction band | — | −4.29 eV | −3.60 eV |
|  | Valence band | — | −5.71 eV | −5.62 eV |

As seen from Table 2, in the semiconductor electrode in each of the photo electrochemical cells of Examples 1 to 3, the band edge level of the conduction band and the band edge level of the valence band of the second semiconductor layer, respectively, were higher than the band edge level of the conduction band and the band edge level of the valence band of the first semiconductor layer. The Fermi level of the first semiconductor layer was the same as that of the second semiconductor layer. Therefore, a value obtained by subtracting the Fermi level of the second semiconductor layer from the band edge level of the conduction band of the second semiconductor layer was greater than that in the first semiconductor layer. Furthermore, a value obtained by subtracting the band edge level of the conduction band of the second semiconductor layer from the Fermi level of the second semiconductor layer was smaller than that in the first semiconductor layer. The Fermi levels of the semiconductors used in Examples 1 to 3 were −5.08 eV, which was within the range of −5.67 eV to −4.44 eV. The band edge levels of the conduction bands of the first semiconductor layers were higher than −4.44 eV. The band edge levels of the valence bands of the second semiconductor layers were lower than −5.67 eV. Therefore, the photoelectrochemical cells of Examples 1 to 3 met the structural requirements of the semiconductor electrode of the present invention.

The semiconductor electrode in the photoelectrochemical cell of Example 4 included the first to third semiconductor layers. The relationships between the band structures of two adjacent semiconductor layers (the third semiconductor layer and the second semiconductor layer, and the second semiconductor layer and the first semiconductor layer) satisfied the relationships between the semiconductor layers described in Embodiment 1. That is, the photoelectrochemical cell of Example 4 corresponded to the cell including N=3 semiconductor layers, among the photoelectrochemical cells including N semiconductor layers described in Embodiment 1.

In the photoelectrochemical cell of Example 5, n-type semiconductors were used for the first semiconductor layer and the second semiconductor layer. The band edge level of the conduction band and the band edge level of the valence band of the second semiconductor layer, respectively, were higher than the band edge level of the conduction band and the band edge level of the valence band of the first semiconductor layer. The Fermi level of the first semiconductor layer was higher than that of the second semiconductor layer. Therefore, a value obtained by subtracting the Fermi level of the second semiconductor layer from the band edge level of the conduction band of the second semiconductor layer was greater than that in the first semiconductor layer. Furthermore, a value obtained by subtracting the band edge level of the conduction band of the second semiconductor layer from the Fermi level of the second semiconductor layer was smaller than that in the first semiconductor layer. The Fermi level of the first semiconductor layer and the Fermi level of the second semiconductor layer used in Example 5 were −4.84 eV and −5.24 eV, respectively, which were within the range of −5.67 eV to −4.44 eV. The band edge level of the conduction band of the first semiconductor layer was higher than −4.44 eV, and the band edge level of the valence band of the second semiconductor layer was lower than −5.67 eV. Therefore, the photoelectrochemical cell of Example 5 met the structural requirements of the semiconductor electrode of the present invention.

In the semiconductor electrode in the photoelectrochemical cell of Comparative Example 3, a value obtained by subtracting the band edge level of the valence band of the second semiconductor layer from the Fermi level of the second semiconductor layer was greater than that in the first semiconductor layer. Furthermore, the band edge level of the valence band of the second semiconductor layer was higher than −5.67 eV. From these points, the photoelectrochemical cell of Comparative Example 3 did not meet the requirements of the photoelectrochemical cell of the present invention.

A simulated sunlight irradiation experiment was conducted on the thus produced photoelectrochemical cells of Examples 1 to 5 and Comparative Example 1 to 3. The simulated sunlight irradiation experiment was conducted as follows.

(Simulated Sunlight Irradiation Experiment)

A solar simulator manufactured by SERIC Ltd. was used to apply simulated sunlight. The surface of the second semiconductor layer (or the third semiconductor layer) in the semiconductor electrode of each of the photoelectrochemical cells of Examples 1 to 5 and Comparative Examples 1 to 3 was irradiated with simulated sunlight at an intensity of 1 kW/m$^2$ through the light incident portion of each photoelectrochemical cell. The gas generated on the surface of the counter electrode was collected for 30 minutes. The components of the collected gas were analyzed and the amount of the gas generated was determined by gas chromatography. Furthermore, the density of the photocurrent flowing between the semiconductor electrode and the counter electrode was measured with an ammeter. The apparent quantum efficiency was calculated using the amount of the gas generated on the counter electrode.

Table 4 below indicates the apparent quantum efficiency measured for each of the photoelectrochemical cells of Examples 1 to 5 and Comparative Examples 1 to 3.

TABLE 4

|  | Quantum efficiency |
|---|---|
| Example 1 | 20 |
| Example 2 | 29 |
| Example 3 | 32 |
| Example 4 | 35 |
| Example 5 | 15 |
| Comparative Example 1 | 6 |
| Comparative Example 2 | — |
| Comparative Example 3 | 8 |

As a result of the analysis of the gas collected in the photoelectrochemical cell of the Example 1, it was confirmed that hydrogen was generated on the counter electrode. The rate of hydrogen generation was $1.8 \times 10^{-7}$ L/s. Furthermore, since the photocurrent flowing between the semiconductor electrode and the counter electrode was 1.2 mA/cm², it was confirmed that the electrolysis of water was performed stoichiometrically. The apparent quantum efficiency was about 20%, as calculated using the following formula.

Apparent quantum efficiency={(measured photocurrent density[mA/cm²])/(photocurrent density obtainable by the sunlight to be possibly absorbed in the band gap of the semiconductor material used for the second semiconductor layer [mA/cm²])}×100

As a result of the analysis of the gas collected in the photoelectrochemical cell of the Comparative Example 1, it was confirmed that hydrogen was generated on the counter electrode. The rate of hydrogen generation was $7.0 \times 10^{-8}$ L/s. Furthermore, since the photocurrent flowing between the semiconductor electrode and the counter electrode was 0.42 mA/cm², it was confirmed that the electrolysis of water was performed stoichiometrically. The apparent quantum efficiency was about 6%, as calculated using the above formula.

As a result of the analysis of the gas collected in the photoelectrochemical cell of the Comparative Example 3, it was confirmed that hydrogen was generated on the counter electrode. The rate of hydrogen generation was $8.5 \times 10^{-8}$ L/s. Furthermore, since the photocurrent flowing between the semiconductor electrode and the counter electrode was 0.53 mA/cm², it was confirmed that the electrolysis of water was performed stoichiometrically. The apparent quantum efficiency was about 8%, as calculated using the above formula.

In view of these results, it is believed that, in the semiconductor electrode of the photoelectrochemical cell of Example 1, efficient charge separation between the electrons and holes generated by photoexcitation inside the second semiconductor layer reduced the probability of the recombination between the generated electrons and holes. Probably as a result, the photoelectrochemical cell of Example 1 showed a higher apparent quantum efficiency than the cells of Comparative Examples 1 and 3.

The photoelectrochemical cell of Comparative Example 2 was irradiated with light. Although it was observed that gas was generated on the surface of the counter electrode, the amount of gas generated was too small to be detected.

As indicated in Table 2, in the semiconductor electrode in the photoelectrochemical cell of Comparative Example 2, the Fermi level of the first semiconductor layer (p-type semiconductor layer) on the conductor side was lower than that of the second semiconductor layer (n-type semiconductor layer) on the surface side. Therefore, Schottky barriers were formed at the junction plane between the first semiconductor layer and the second semiconductor layer. Probably, these barriers prevented charge separation between the electrons and holes generated by photoexcitation inside the second semiconductor layer, resulting in a higher probability of the recombination between the generated electrons and holes, and thus, in a failure to generate hydrogen efficiently.

The same experiment was performed with the photoelectrochemical cells of Examples 2 to 4. As a result, as indicated in Table 3, the cells of Examples 2 to 4 showed apparent quantum efficiencies of 29%, 32%, and 35%, respectively.

It could be confirmed from these results that since the ohmic loss derived from the conducting wire was eliminated in the photoelectrochemical cell of Example 3, the apparent quantum efficiency was further improved, compared to the photoelectrochemical cells of Examples 1 and 2.

The apparent quantum efficiency of the photoelectrochemical cell of Example 5 was 15%, although the apparent quantum efficiency of CdS alone was about 5% in Example 5. It was confirmed from these results that with the use of a semiconductor electrode that includes a plurality of semiconductor layers whose band structure relationships meet the requirements of the present invention, hydrogen can be generated more efficiently than the separate use of these semiconductor materials.

Photoelectrochemical cells were produced with various combinations of the p-type semiconductor materials indicated in Table 1 so that the structural requirements of the semiconductor electrode of the present invention were met, and the apparent quantum efficiencies thereof were measured. As a result, the highest apparent quantum efficiency was 40%.

It should be noted that an $Na_2SO_3$ aqueous solution containing $Na_2S$ was used as an electrolyte in each of the photoelectrochemical cells of Examples 1 to 5 and Comparative Examples 1 to 3. In view of this, presumably, when the semiconductor electrode was irradiated with light, the reaction that proceeded in the semiconductor electrode was not an oxygen evolution reaction according to the above-indicated reaction formula (1) but a reaction according to the below-indicated reaction formula (3). Presumably, the reaction expressed by the aforementioned reaction formula (2) proceeded in the counter electrode.

Formula (3):

$$2h^+ + S^{2-} \rightarrow S \qquad (3)$$

$BaZr_{0.8}In_{0.2}O_{3-\alpha}$ was used for the first semiconductor layer in the photoelectrochemical cell of Example 2, and $BaZr_{0.8}In_{0.2}O_{3-\alpha}$ was used for the first semiconductor layer in the photoelectrochemical cell of Example 4, but instead, $BaZr_{0.4}Ce_{0.4}In_{0.2}O_{3-\alpha}$ may be used. A $BaZr_{0.4}Ce_{0.4}In_{0.2}O_{3-\alpha}$ film can be formed, for example, by sputtering. The band edge level of the conduction band and the band edge level of the valence band are indicated in Table 1. A semiconductor electrode using these materials also meets the requirements of the semiconductor electrode of the present invention. This means that the apparent quantum efficiency is expected to be improved, as is the case with Example 1. It should be noted that the band edge levels of the conduction bands and the band edge levels of the valence bands, and the band gaps of the p-type semiconductors indicated in Table 1 are the actual values measured by UPS, AC-3, or ultraviolet-visible spectroscopy (UV-Vis). In USP, photoelectron spectroscopic measurement was performed in vacuum using a sample obtained by electrodepositing a powder sample on a Pt substrate. In AC-3, photoelectron spectroscopic measurement with an atmospheric photoelectron spectrometer (AC-3, Riken Keiki Co., Ltd.) was performed in the atmosphere using a disk-shaped bulk sample (with a diameter of 12 cm and a thickness of 0.5 cm). In UV-V is, absorption spectroscopic measurement was performed by a transmission method or a diffuse reflection method also using a disk-shaped bulk sample or a powder sample.

INDUSTRIAL APPLICABILITY

The photoelectrochemical cell and the energy system of the present invention can improve the quantum efficiency of the hydrogen evolution reaction by irradiation with light, and thus are useful as a domestic power generation system and the like.

The invention claimed is:

1. A photoelectrochemical cell comprising:
a semiconductor electrode including a conductor and a semiconductor layer disposed on the conductor;
a counter electrode connected electrically to the conductor;
an electrolyte in contact with surfaces of the semiconductor layer and the counter electrode; and
a container accommodating the semiconductor electrode, the counter electrode and the electrolyte, wherein
a band edge level $E_{CS}$ of a conduction band, a band edge level $E_{VS}$ of a valence band, and a Fermi level $E_{FS}$ in a surface near-field region of the semiconductor layer, and a band edge level $E_{CJ}$ of a conduction band, a band edge level $E_{VJ}$ of a valence band, and a Fermi level $E_{FJ}$ in a junction plane near-field region of the semiconductor layer with the conductor satisfy, relative to a vacuum level, $E_{CS}-E_{FS}>E_{CJ}-E_{FJ}$, $E_{FS}-E_{VS}<E_{FJ}-E_{VJ}$, $E_{CJ}>-4.44$ eV, and $E_{VS}<-5.67$ eV, and
the Fermi level $E_{FS}$ in the surface near-field region of the semiconductor layer and the Fermi level $E_{FJ}$ in the junction plane near-field region of the semiconductor layer with the conductor satisfy, relative to the vacuum level, $-5.67$ eV$<E_{FS}<-4.44$ eV and $-5.67$ eV$<E_{FJ}<-4.44$ eV, respectively, wherein
the semiconductor layer contains at least one selected from perovskite-type oxide semiconductors represented by the following general formulae A and B:

$$BaZr_{1-x}M_xO_{3-\alpha}$$ (General Formula A)

where M denotes at least one element selected from trivalent elements, x denotes a numerical value of more than 0 and less than 1, and α denotes an amount of oxygen deficiency that is a numerical value of more than 0 and less than 1.5; and $$BaZr_xCe_yM_{1-x-y}O_{3-\alpha}$$ (General Formula B)

where M denotes at least one element selected from trivalent elements, x denotes a numerical value of more than 0 and less than 1, y denotes a numerical value of more than 0 and less than 1, x+y<1 is satisfied, and α denotes an amount of oxygen deficiency that is a numerical value of more than 0 and less than 1.5.

2. The photoelectrochemical cell according to claim 1, wherein
the semiconductor layer includes first to Nth (N is an integer of 2 or more) semiconductor layers that are disposed in this order on the conductor,
when two adjacent layers selected from the first to Nth semiconductor layers are referred to as a (K−1)th (K is an integer of 2 to N) semiconductor layer and a Kth semiconductor layer from the side of the conductor, a band edge level $E_{CK}$ of a conduction band, a band edge level $E_{VK}$ of a valence band, and a Fermi level $E_{FK}$ of the Kth semiconductor layer, and a band edge level $E_{C(K-1)}$ of a conduction band, a band edge level $E_{V(K-1)}$ of a valence band, and a Fermi level $E_{F(K-1)}$ of the (K−1)th semiconductor layer satisfy, relative to the vacuum level, $E_{CK}-E_{FK}>E_{C(K-1)}-E_{F(K-1)}$, $E_{FK}-E_{VK}<E_{F(K-1)}-E_{V(K-1)}$, $E_{C(K-1)}>-4.44$ eV, and $E_{VK}<-5.67$ eV, and
the Fermi level $E_{FK}$ of the Kth semiconductor layer and the Fermi level $E_{F(K-1)}$ of the (K−1)th semiconductor layer satisfy, relative to the vacuum level, $-5.67$ eV$<E_{FK}<-4.44$ eV and $-5.67$ eV$<E_{F(K-1)}<-4.44$ eV, respectively.

3. The photoelectrochemical cell according to claim 1, wherein the semiconductor layer includes at least two elements, and at least one of the elements in the semiconductor layer has a concentration increasing or decreasing along a thickness direction of the semiconductor layer.

4. The photoelectrochemical cell according to claim 1, wherein the semiconductor layer is composed of at least one selected from the group consisting of oxide, nitride, and oxynitride.

5. The photoelectrochemical cell according to claim 1, wherein the semiconductor layer contains an oxide containing barium, zirconium and indium as constituent elements, or an oxide containing barium, zirconium, cerium and indium as constituent elements.

6. The photoelectrochemical cell according to claim 1, wherein the counter electrode is disposed on the conductor.

7. An energy system comprising:
the photoelectrochemical cell according to claim 1;
a hydrogen storage, connected to the photoelectrochemical cell by a first pipe, for storing hydrogen generated inside the photoelectrochemical cell; and
a fuel cell, connected to the hydrogen storage by a second pipe, for converting the hydrogen stored in the hydrogen storage into electricity.

* * * * *